Feb. 15, 1966 J. C. EWIN 3,235,666

UNIVERSAL TELEPHONE LINE CONCENTRATOR SYSTEM

Filed June 29, 1962 14 Sheets-Sheet 1

INVENTOR
J. C. EWIN
BY S E Hollander
ATTORNEY

Feb. 15, 1966 J. C. EWIN 3,235,666

UNIVERSAL TELEPHONE LINE CONCENTRATOR SYSTEM

Filed June 29, 1962

14 Sheets-Sheet 2

INVENTOR
J. C. EWIN
BY
SEHollander
ATTORNEY

Feb. 15, 1966

J. C. EWIN 3,235,666

UNIVERSAL TELEPHONE LINE CONCENTRATOR SYSTEM

Filed June 29, 1962

14 Sheets-Sheet 3

INVENTOR
J. C. EWIN
BY
SE Hollander
ATTORNEY

Feb. 15, 1966 J. C. EWIN 3,235,666

UNIVERSAL TELEPHONE LINE CONCENTRATOR SYSTEM

Filed June 29, 1962

14 Sheets-Sheet 4

INVENTOR
J. C. EWIN

BY SE Hollander

ATTORNEY

INVENTOR
J. C. EWIN
BY
SE Hollander
ATTORNEY

INVENTOR
J. C. EWIN
BY
SE Hollander
ATTORNEY

INVENTOR
J. C. EWIN
BY
SEHollander
ATTORNEY

Feb. 15, 1966 J. C. EWIN 3,235,666

UNIVERSAL TELEPHONE LINE CONCENTRATOR SYSTEM

Filed June 29, 1962

14 Sheets-Sheet 8

INVENTOR
J. C. EWIN
BY
S E Hollander
ATTORNEY

INVENTOR
J. C. EWIN
BY SE Hollander
ATTORNEY

FIG. 10 SEQUENCE CHART ORIGINATING CALL LINE CONCENTRATOR

INVENTOR
J. C. EWIN
BY S E Hollander
ATTORNEY

INVENTOR
J. C. EWIN
BY
SE Hollander
ATTORNEY

INVENTOR
J. C. EWIN
BY SE Hollander
ATTORNEY

INVENTOR
J. C. EWIN
BY
SE Hollander
ATTORNEY

FIG. 14

| LINE NO. | B RELAY | A RELAY |
|---|---|---|
| 1 | B1 | A1 |
| 2 | B1 | A2 |
| 3 | B1 | A3 |
| 4 | B1 | A4 |
| 5 | B1 | A5 |
| 6 | B1 | A6 |
| 7 | B2 | A1 |
| 8 | B2 | A2 |
| 9 | B2 | A3 |
| 10 | B2 | A4 |
| 11 | B2 | A5 |
| 12 | B2 | A6 |
| 13 | B3 | A1 |
| 14 | B3 | A2 |
| 15 | B3 | A3 |
| 16 | B3 | A4 |
| 17 | B3 | A5 |
| 18 | B3 | A6 |
| 19 | B4 | A1 |
| 20 | B4 | A2 |
| 21 | B4 | A3 |
| 22 | B4 | A4 |
| 23 | B4 | A5 |
| 24 | B4 | A6 |
| 25 | B5 | A1 |
| 26 | B5 | A2 |
| 27 | B5 | A3 |
| 28 | B5 | A4 |
| 29 | B5 | A5 |
| 30 | B5 | A6 |
| 31 | B6 | A1 |
| 32 | B6 | A2 |
| 33 | B6 | A3 |
| 34 | B6 | A4 |
| 35 | B6 | A5 |
| 36 | B6 | A6 |
| 37 | B7 | A1 |
| 38 | B7 | A2 |
| 39 | B7 | A3 |
| 40 | B7 | A4 |
| 41 | B7 | A5 |
| 42 | B7 | A6 |
| 43 | B8 | A1 |
| 44 | B8 | A2 |
| 45 | B8 | A3 |
| 46 | B8 | A4 |
| 47 | B8 | A5 |
| 48 | B8 | A6 |

INVENTOR
J. C. EWIN
BY
S E Hollander
ATTORNEY

3,235,666
UNIVERSAL TELEPHONE LINE CONCENTRATOR SYSTEM

James C. Ewin, Colonia, N.J., assignor to Bell Telephone Laboratories, Incorporated, New York, N.Y., a corporation of New York Filed June 29, 1962, Ser. No. 206,418
19 Claims. (Cl. 179—18)

This invention relates to telephone line concentrator systems, and more particularly, to concentrator systems employing signaling circuits utilizing speech trunks in which information pertinent to several subgroups of the line identification is transmitted during a single signaling cycle.

Telephone line concentrators are utilized to reduce outside plant expenditures and other copper costs by precluding the necessity for extending each substation line directly to the office. Instead, the lines the grouped at a remote location and "concentrated" over a smaller number of trunks which extend to the office. The remote unit is energized under control of the office to connect specific lines requiring service to idle trunks on a shared basis. Since concentration ratios of five-to-one are not extraordinary, the economies effected are obvious and have given impetus to line concentrator development in the recent past.

However, the basic principle on which line concentration is predicated, namely, the divorcing of the substation line from its traditional direct connection to the office has given rise to a number of significant technical problems. In the past, supervision of telephone lines for on-hook, off-hook dialing, etc., was a relatively routine matter to be performed at the central office by using line relays. These supervisory signals must now be forwarded in some relatively indirect manner since, in line concentrator operation, the line no longer has a direct connection to the office. In consequence, the signaling of identification and control information to and from the remote concentrator has become a focal point of line concentrator technology.

Previously, certain prior art devices have operated on what has been referred to as a "dynamic" scanning basis. In these concentrators all substation lines are sequentially examined by a scanning device and the information derived therefrom is transmitted, also sequentially, to the central office on a time division basis. Since these units require a continuous flow of interrogation pulses to ascertain the condition of the substation lines, the quantity of control signal traffic is often prodigious. Moreover, since control channels must be made available to support the flow of this information the arrangement is partially self-defeative because prior to line concentration no control channels were required and, as discussed above, the purpose of line concentration is to reduce the total number of channels extending to the office.

In certain other prior art units the disadvantages inherent in dynamic scanning were sought to be avoided by asynchronous or passive type line supervision. In this arrangement each line termination at the remote line concentrator is connected to a coding device which upon a change in line supervisory condition transmits a prearranged code (on a 3-out-of-8 basis, for example) to the central office over the code conductors reserved for this purpose. Here again, however, a relatively large number of control conductors are required contrary to the over-all purpose of line concentration which is to reduce the number of conductors.

It is therefore an object of this invention to provide a line concentrator signaling facility which is adapted to operate on a static or quiescent basis until a change in line supervisory condition occurs at which time operation is transferred to a dynamic or synchronous basis, thereby reducing the total number of control conductors required.

In a number of prior art concentrator units, speech paths were reserved exclusively for speech communication and control paths reserved for control communication. In consequence, the total number of channels reflected the combined needs for speech and control signaling. Moreover, certain other prior art units were adapted to combine speech and control signaling over a single path but in a relatively inflexible manner whereby certain specific speech paths would always be reserved for the performance of signaling functions as well as speech transmission.

It is therefore an additional object of this invention to provide for a line concentrator signaling arrangement in which a portion of the control signals is transmitted over a preselected speech trunk, which trunk varies with each individual calling connection.

In certain prior concentrator signaling systems, the information pertinent to changes in supervisory conditions on particular lines was transmitted from the remote unit to the central office as distinct information items in which each item specifies a particular subgroup of the line to be identified. Thus, for example, in my Patent 3,022,382, of February 20, 1962, information was transmitted between the remote unit and the central office in distinctive bursts. The necessity for isolating separate items of information into separate and distinct time frames is understandable in view of the necessity for maintaining a separation between individual subgroups of line information. To illustrate the point, it may be assumed that a particular line, for example line 22, is represented by subgroups A4 and B4 in which each subgroup of A includes six lines and each subgroup of B includes eight lines. In certain prior devices this information would be transmitted from the remote unit to the central office to indicate the line identification on an originating code by transmitting the B information of four units or pulses representing the B digit 4, pausing, and then transmitting the A digit information representing the A digit 4 which may also be four pulses. This sequential type of divided operation in which information pertinent to the A subgroup identity must be totally isolated and in separate time frames from the information relating to the B subgroup identity is partially wasteful and inefficient (although completely operative and useful) in view of the protracted time required to complete the signaling operation. Since control channels are ordinarily held to a minimum for obvious reasons and, since a relatively large number of substation lines must share these few control channels on a time division basis, the allocation of time slots available to each line is restricted.

It is therefore an object of this invention to transmit both subgroups of a line identification simultaneously rather than sequentially.

An additional object of this invention is to preclude the necessity for transmitting subgroup identities in distinct time frames.

Still another object of this invention is to transmit the identity of both subgroups representing a particular line in precisely the same signaling cycle when the A subgroup number and the B subgroup number are equal.

Perhaps the most desirable form of line concentrator is the universal type which derives its name from the universality of its application to most conventional switching systems without substantial invasion or modification of the conventional system. In the past (as shown, for example, in my Patent 3,022,382 referred to above) a hallmark of universal line concentrator operation was the provision of individual line relays or other equivalent sensory mechanisms at the remote unit corresponding to the line relays individual to each line at the central office. Since the remote unit of a line concentrator is, by definition, at some substantial distance from the office and is usually pole mounted or enclosed in a vault, space as well as weight restrictions are critical. In consequence, the provision of an illustrative group of forty-eight separate and distinct line relays at a remote unit to service forty-eight lines terminated thereat adds substantially to the volume occupied by the remote unit.

It is therefore an object of this invention to provide a remote line concentrator unit which although universal in type and universal in application does not require an individual line relay for each substation line.

Still another object of this invention is to provide a multiline relay at the remote concentrator unit which is shared by a group of lines.

These and other objects and features of the invention may be achieved in a specific illustrative embodiment in which a remote line concentrator is provided for terminating forty-eight lines connected to subscriber substations. A total of nine speech trunks and one trunk reserved exclusively for control signaling extend to the office. A switching network is provided in the remote unit for connecting the larger number of substation lines to the smallest number of speech trunks on a shared basis. An equivalent switching network is provided in the central office portion of the concentrator system to "fan out" the speech trunks to forty-eight line terminations which extend individually to corresponding conventional terminations representing the individual substation lines to the telephone central office.

Each substation line is connected to a multiline relay which operates as a result of the energization of any one of the six lines connected thereto in order to identify the B subgroups information of a particular line identity. The remaining portion of the line identity or A subgroup information is derived as a result of interrogating signals from the central office which are initiated as a result of the service request or calling condition, for example, on the line to be identified.

Once summoned, the central office delivers a series of interrogating pulses to scanning and counting relays at the remote unit. When a number of pulses equal to the A subgroup identity is transmitted, the multiline relay energized by the calling line is released and a signal is transmitted to the central office. The B information is transmitted wholly simultaneously to the office. When the office has transmitted a number of interrogation pulses equal to the B subgroup identity, a signal is delivered to the office by the remote unit. Since the remote unit apprises the office of the particular A subgroup identity by delivering a negative signal thereto and the particular B subgroup identity by delivering a positive signal thereto, both items of information may be delivered during the same interrogation cycle without confusion.

Moreover, each interrogating pulse delivered to the remote unit advances the A count and B count thereat by one unit thus indicating a truly simultaneous delivery of both A and B information.

As an illustration, if the A digit is "4" and the B digit is "6" representing line 34, the office would transmit a total of only six interrogation pulses. During the fourth pulse from the central office, the remote unit returns a negative signal to the office to indicate that the A digit is "4" thereby registering the A indication at the office. Upon reception of the sixth pulse, the remote unit transmits a positive signal to the office to indicate that the B digit is "6." Here again, the first four pulses obviously conveyed information pertinent to both the A and B digits and did so wholly simultaneously.

In consequene, if the A subgroup identity is "4" and the B subgroup identity is "4," both items of information are transmitted immediately after the fourth interrogation pulse as distinguished from the prior art arrangement adverted to above in which a total of perhaps eight pulses (4 and 4) would be required.

Since the central office interrogating pulses are delivered upon command from the remote unit, the disadvantages of dynamic scanning are avoided since no scanning of any kind takes place during a quiescent period of the concentrator. All of the signaling information from the remote unit indicating subgroup identification adverted to above is transmitted over a preselected speech trunk which is the trunk to be utilized next for a calling connection. Arrangements are made to continuously shift these pulses to a newly preselected trunk after each connection. In this manner the control path is in effect constantly varying with each calling connection.

After the A and B subgroup information have been transmitted to the office a complete registration of the calling line identification is available thereat and the office proceeds to transmit a signal to the remote unit to effectuate the operation of the cutoff relay associated with the calling line and to connect the calling line to the preselected trunk thereby providing a "clean" tip and ring connection to the office (free of bridging impedances).

Having connected the line to the trunk the office now proceeds to select a new trunk and to connect the signaling equipment at the remote unit to the new trunk to permit further control signaling over the new trunk since the previously selected trunk is now exclusively engaged in servicing the calling line.

Under these circumstances the office proceeds to transmit the trunk identification of the newly selected trunk to the remote unit by delivering a series of signal pulses to the unit over the same path and in the same manner as the interrogation pulses adverted to above. However, the signaling character is varied in the sense that the signals are no longer under control of the remote unit but instead are now responsive to equipment at the central office which selects the particular trunk. Thus, if trunk 2 is the newly selected trunk, a total of two impulses will be delivered to the remote unit with instructions to operate the relays individual to trunk 2 in order to connect the newly selected trunk 2 to the signaling equipment at the remote unit.

For purposes of efficiency the present invention utilizes the concept of "delay disconnect" in which a concentrated line is not disconnected after a calling connection from the trunk which was utilized to extend the line to the office until the trunk itself is required for an additional connection. As a result, the problem now arises of restoring to service the line previously connected to the newly selected trunk 2 since the cutoff relay (which is illustratively of the magnetic latching variety) for that line remains operated. If the line 2 is not restored to service it remains in effect a "dead" line without dial tone or side tone and the subscriber cannot originate any calls therefrom. In order to restore the substation line previously connected to trunk 2, the central office simulates a terminating connection to that line in response to a signal delivered over trunk 2 when it was disconnected from the line and connected to the signaling equipment. This signal is transmitted over the trunk and extends through the switching network in the central office to a termination individual to the line which is to be restored to service. This termination is connected to a coding device analogous to that utilized in the remote line unit as described above and the A subgroup identification and B subgroup identification of the line to be restored are registered in appropriate equipment at the central office.

Thereafter the A subgroup identification and the B subgroup identification are transmitted to the remote unit simultaneously in a manner to that described above for the originating call except that in this instance all signaling is under control of the central office rather than the remote unit.

When the line identification is stored in the A and B registers at the remote unit, the particular cutoff relay individual to the line is operated under contacts of the registers in response to a signal from the central office and the cutoff relay is released restoring the line to service. Thereafter the common equipment in the concentrator is released in response to a signal from the office and further calls may be processed.

A feature of this invention includes facilities for transmitting signal information in pulse trains in which individual pulses in the train each represent different subgroup identifications.

Still another feature of this invention includes facilities in a remote line concentrator unit for delivering information representing two distinct identification subgroups during a single interrogation cycle.

A further feature of this invention includes arrangements for identifying one of two subgroups of line identification in response to the operation of a line relay at the remote unit.

Another feature of this invention includes arrangements for establishing a second subgroup of the line identification in response to the release of the same line relay under control of interrogating pulses from the central office.

An additional feature of this invention includes the use of a single multiline relay to serve a plurality of remote concentrator lines in lieu of the provision of an individual relay for each line.

A further feature of this invention includes arrangements for bidirectional transmission between the central office and the remote unit over a preselected speech trunk wherein the speech trunk thus used for signaling is changed with each calling connection.

Another feature of this invention includes relay tree facilities for selectively connecting speech trunks to signaling units at the remote location and at the central office.

Another feature of this invention includes relay tree facilities for connecting the same speech trunks previously used for signaling to the corresponding line terminations at the remote unit and at the central office to effectuate speech connections.

Still another feature of this invention includes arrangements for releasing a magnetically latched cutoff relay corresponding to a line previously connected to a trunk selected for signaling without the necessity of maintaining a record at the remote unit of the lines connected to particular trunks.

Still another feature of this invention includes facilities for transmitting line and trunk information from the central office to the remote unit through the utilization of signaling pulses which are similar to the interrogating pulses utilized in transmitting line identification from the remote unit to the central office.

Another feature of this invention includes facilities for transmitting trunk identification from the central office to the remote unit representing a newly selected trunk by utilizing signal pulses which are similar to the pulses utilized for transmitting line identification information.

These and other objects and features of the invention may be more readily apprehended from an examination of the following specification, appended claims, and attached drawing in which:

FIG. 1A discloses an illustrative embodiment of the invention in outline form showing the equipment at the remote location;

FIG. 1B indicates the control unit equipment of the illustrative embodiment at the central office location, also in outline form;

FIGS. 2–9 indicate the details of the structure shown in outline form in FIGS. 1A and 1B wherein:

FIG. 2 shows the service request matrix, cutoff relay control tree, and a trunk relay tree for trunk 1;

FIG. 3 indicates the A and B registers in detail as well as the scanning and counting relays at the remote unit;

FIG. 4 discloses in outline form additional trunk relay trees and trunk relays which are the same as the one disclosed in FIG. 2;

FIG. 5 shows the trunk counter control relay equipment and the transmitter-receiver adapted to operate in conjunction with a preselected speech trunk and a receiver adapted to operate in conjunction with the control trunk;

FIG. 6 discloses the central office switching network for connecting the nine speech trunks to the forty-eight line terminals (which are conventional equipment) in the central office and also shows the central office portion of the signaling equipment connectable to the preselected speech trunk;

FIG. 7 shows the transmitter adapted to operate over the control trunk, control equipment at the central office portion of the concentrator, and encoding and decoding apparatus which perform functions at the central office analogous to those performed at the remote unit by the service request matrix and the A and B registers;

FIG. 8 shows the manner in which FIGS. 2–7 are to be arranged to disclose the invention;

*General description*

Figure 1A:
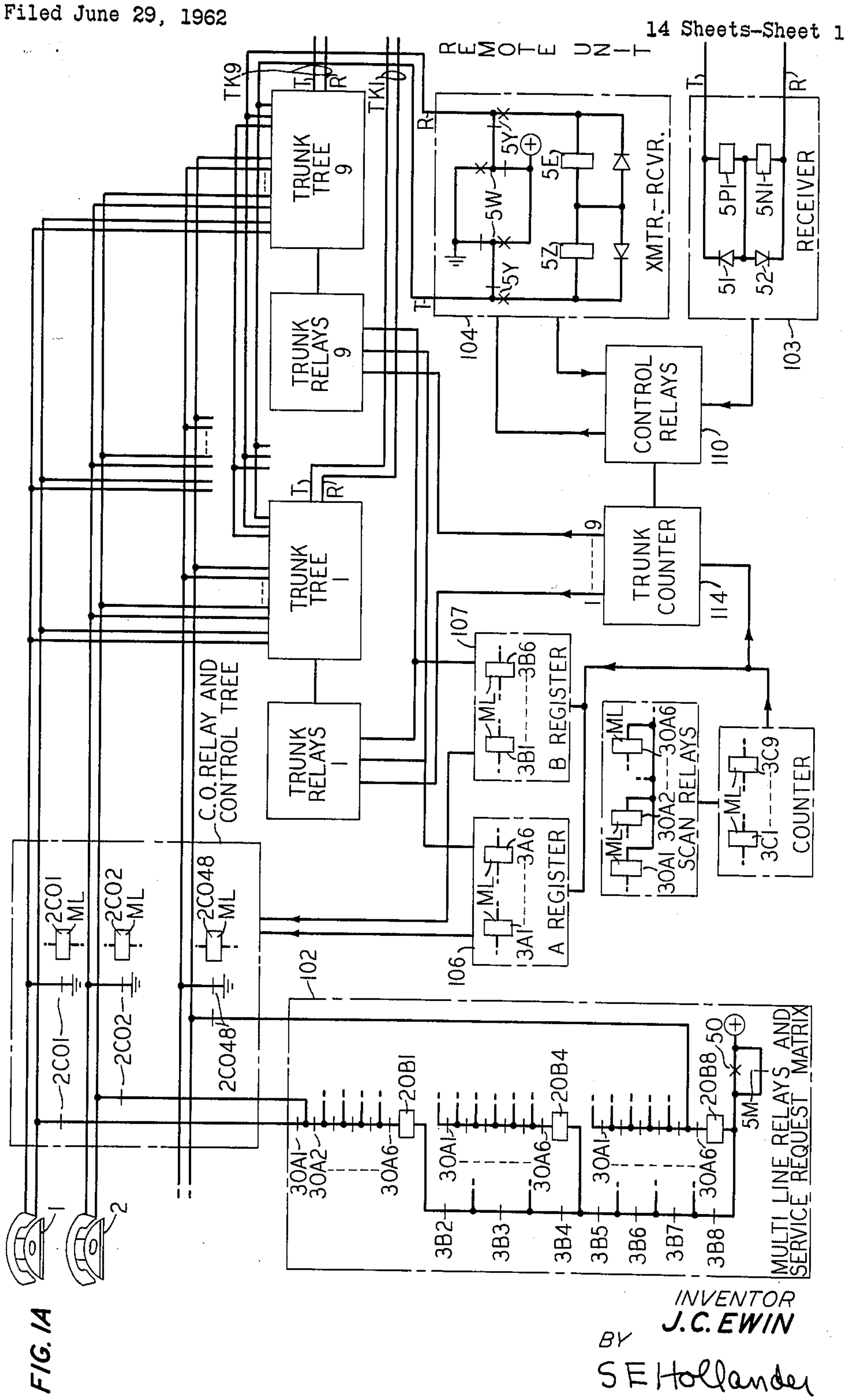
Figure 1B:
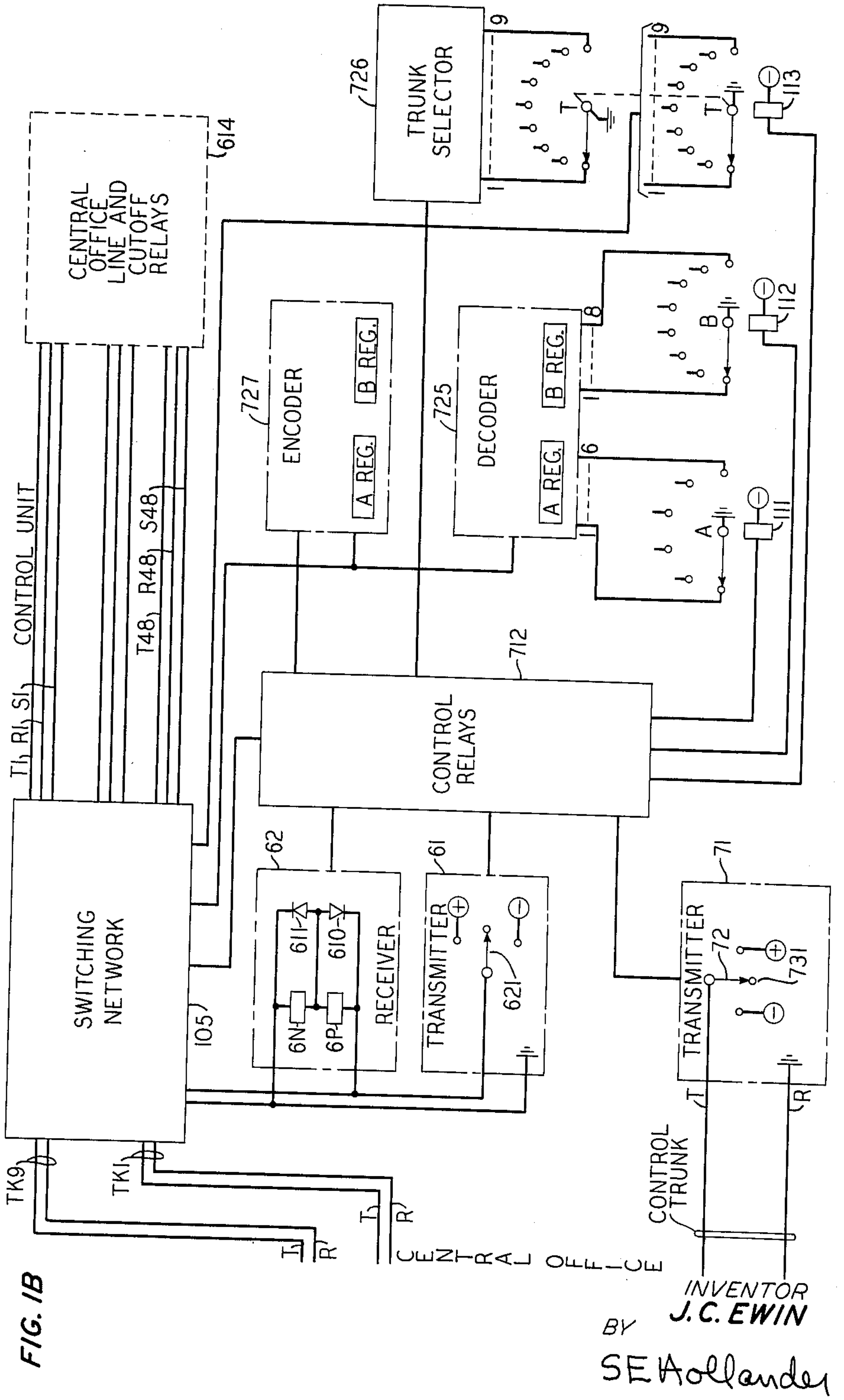

Referring now to FIGS. 1A and 1B, a general description of the major components followed by a general description of the operation of these components follows.

*General description of major components*

Figure 2:
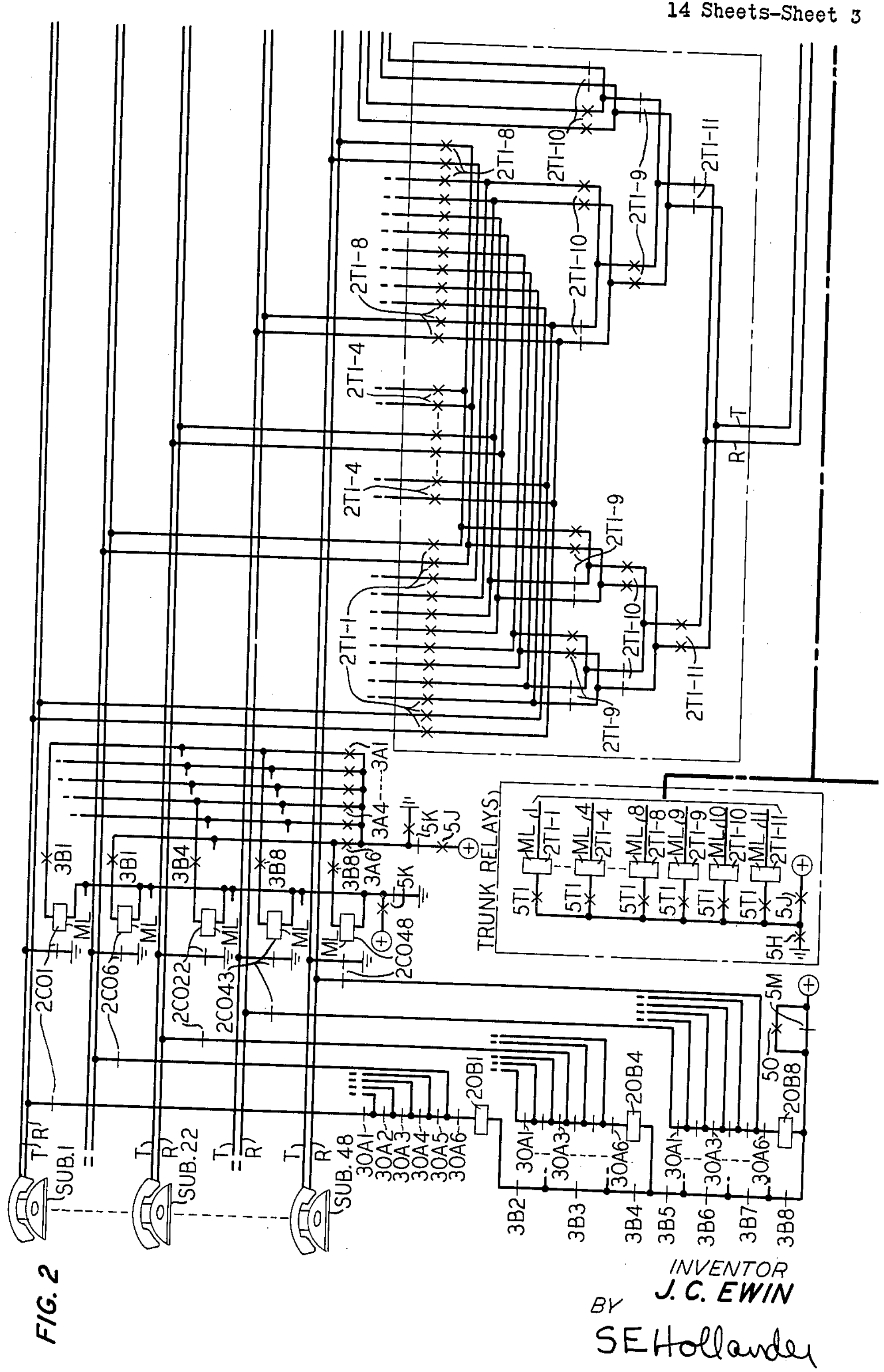

In FIG. 1A, a typical substation line 1 is shown connected to the concentrator and obtains access to trunks TK1–TK9 under control of trunk relay trees 1 through 9, respectively. Additional substations, including substation 2, and illustratively forty-six more (not shown) are also connectable to the same trunks through trunk relay trees 1–9. The trunk relay trees, although shown in outline form in FIG. 1A, may include relay tree type circuitry by which a large number of lines connected to the input to the tree obtain access to a single trunk at the output of the tree, as shown in detail in FIG. 2.

The cutoff relay and control tree 101 includes an individual cutoff relay 2CO– for each line and a tree circuit (not shown) for obtaining access to a particular cutoff relay to operate and release the relay under control of the central office as explained herein.

The multiline relays and service request matrix 102 includes a multiline relay 20B– for each six lines. Since it is assumed that forty-eight lines will be illustratively employed, a total of eight relay 20B1–20B8 are shown.

As is apparent from FIG. 1, substation 1, on going off hook, will effect the operation of relay 20B1 over the contacts of cutoff relay 2CO1 and numerous other contacts via a path explained herein in detail.

The signaling circuitry between the central office control unit and the remote unit includes two distinct groups of equipment. The first combination includes transmitter 71 at the control unit and receiver 103 at the remote unit. This transmitter and receiver are in continuous connection to each other over the control trunk as shown. The transmitter function is shown symbolically as adapted to perform a trinary signaling capability. Thus, switch 72 when at the blank terminal 731 transmits an open circuit (or zero current) signal to the remote unit in which event relays 5P1 and 5N1 are both released. When switch 71 is moved to the positive or negative terminals, relays 5P1 and 5N1, respectively, are operated.

The other signaling combination includes a transmitter-receiver 104 at the remote unit, transmitter 61 and receiver 62 at the control unit. The transmitter 61 and receiver 62 at the control unit are not continuously interconnected to the transmitter-receiver 104 at the remote unit over the same trunk but instead are interconnected over various speech trunks. The particular trunk used to interconnect the units at any given time is the next trunk to be utilized for speech transmission. Thus, transmitter-receiver 104 is connectable via trunk relay trees 1–9 to each of the trunks TK1–TK9 as required. At the central office, the transmitter-receiver 62 is also connectable to each of the trunks 1–9 to complete the circuit through the switching network 105. The arrangement for signal transmission from the transmitter 61 to the remote unit is similar to that described for transmitter 71. Moreover, the transmitter-receiver 104 functions in an analogous fashion. The scan relays 30A1–30A6 and the counting relays 3C1–3C9 are operated under control of the transmitter 71 at the control unit in the central office.

The A and B registers 106 and 107, respectively, indicate subgroups of the identification of each line. Using a relay translator described in detail in FIG. 3, each line is coded according to a particular A and B designation. The A digit register includes six relays and the B digit register includes eight relays, the combinations being arranged in such manner that a particular line identification, for example line 22, would be equal to a code value of A4 and B4. Thus, the relationship between the coded designation and the actual line designation is simply that B4 indicates the fourth group of six lines (i.e., lines 19–24) and A4 indicates the fourth line in the particular group, or line 22.

Figures 7, 8:
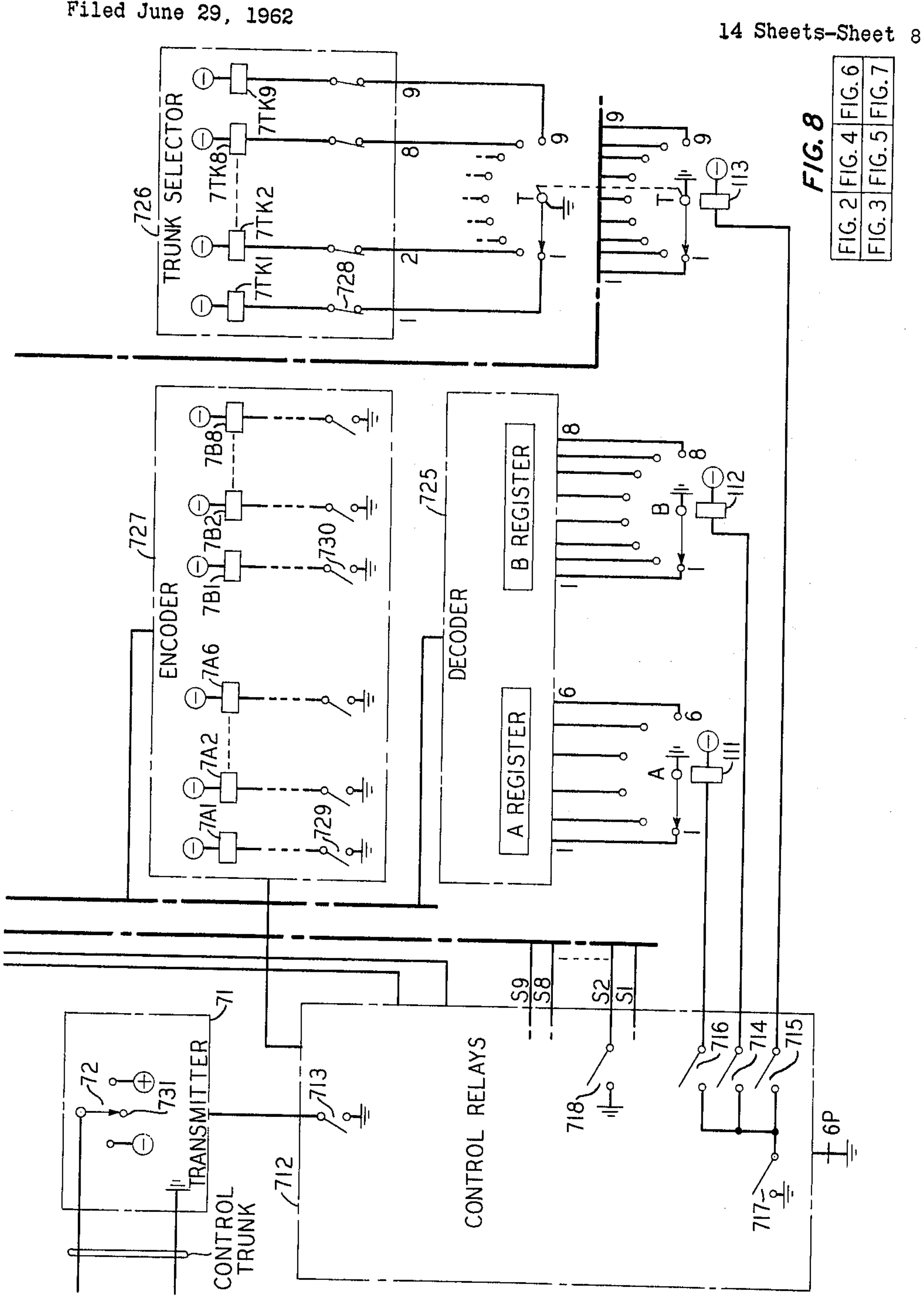

At the central office the control relays 712 include equipment common to the remainder of the circuit thereat as shown in detail in FIG. 7.

Figure 6:
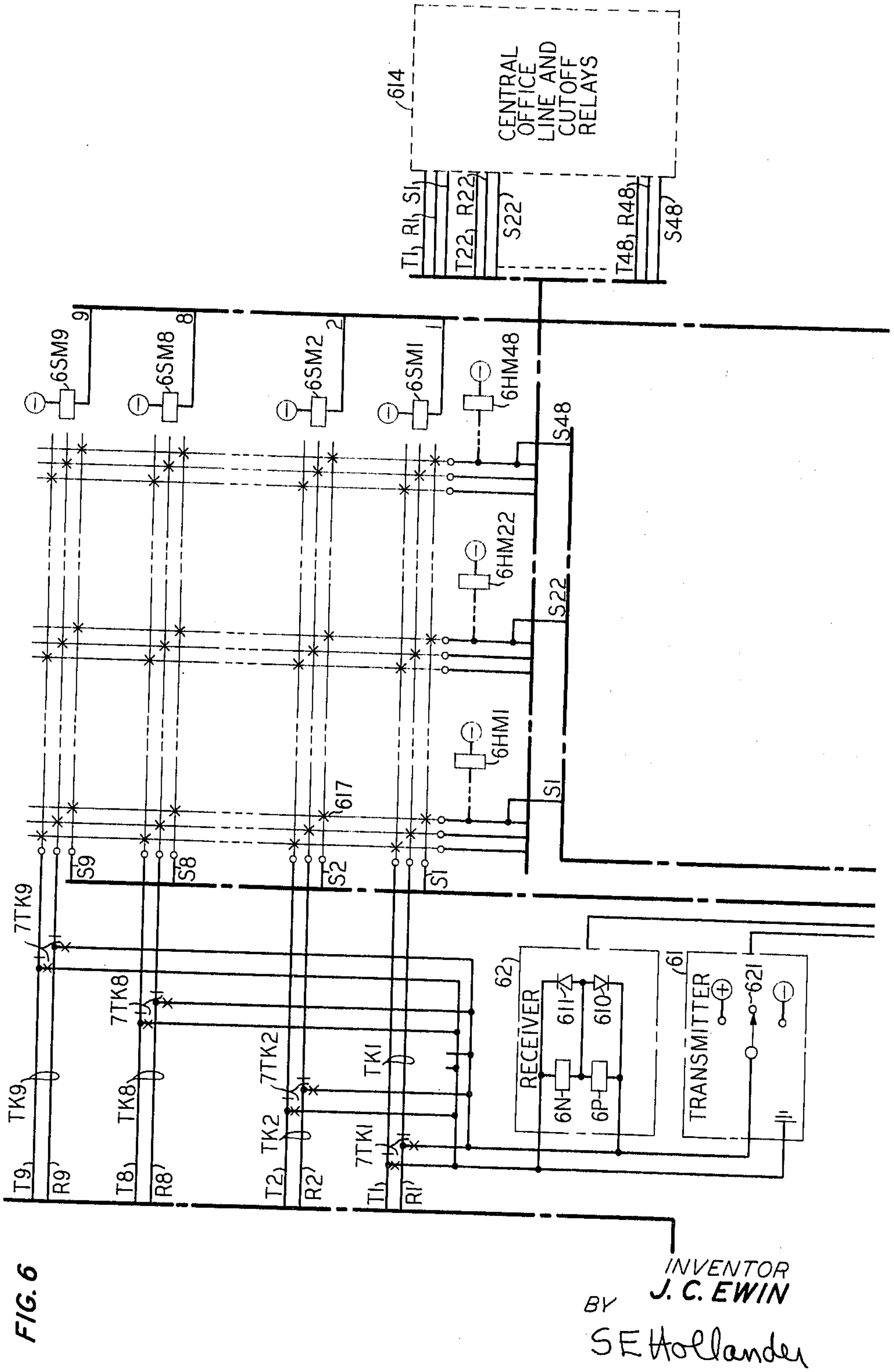

The switching network 105 is illustratively a crossbar type apparatus for connecting the nine trunks to forty-eight line terminals as shown in detail in FIG. 6. The latter terminals represent the individual concentrated lines at the remote unit and are, in fact, the existing conventional line terminals in the central office as shown in dotted outline form at 614.

The encoder 727 includes a group of A and B relays similar to that discussed for the A and B registers 106 and 107 and performs the function of translating a particular A and B coded combination into the appropriate line designation. The decoder 725 includes equipment which is responsive under control of stepping switches 111 and 112 to receive information from the remote unit to store the equivalent A and B designations of a given line identification in the decoder which in turn converts the A and B identification into the appropriate line designation. The trunk selector 726, as shown in detail, is utilized to transmit, in conjunction with switch 113, information designation a selected trunk to the remote unit.

It will be noted that certain of the control and other relays, such as relay 5M, are magnetically latching relays of the type disclosed in my Patent 3,022,382. These relays are all indicated by the designation "ML." A characteristic of this type of relay is that after operating as a result of current passed through the winding in one direction, they remain operated without further power drain until current is passed through the same winding in the opposite direction.

The advantage of this type of relay in a remote unit relates to the power savings inherent in magnetic latching operation.

*General description of operation*

It will be assumed for purposes of illustration that substation 1 is initiating a call to a distant line. When substation 1 goes off hook, a circuit may be traced for the operation of relay 20B1 over a path including ground, contacts of relay 2CO1, substation loop, substation 1, additional contacts of relay 2CO1, contacts of relays 30A1–30A6, winding of relay 20B1, contacts of relays 3B2–3B8, contacts of relay 5M to positive battery. Multiline relay 20B1 operates over this path and through the control relay 110 energizes transmitter-receiver 104 to deliver a signal to the central office by removing a positive signal from whichever speech trunk is connected to transmitter-receiver 104 by the corresponding trunk relay tree. For purposes of illustration, it will be assumed that trunk TK1 is connected through trunk relay tree 1 to transmitter-receiver 104. In consequence, the operation of relay 5Y results in the transmission of an open-circuit or service request signal to the control unit switching network over trunk TK1 and thence to receiver 62 thereby releasing relay 6P to initiate operations at the control unit in response to control relay 712, all as explained in detail herein.

At the remote unit, a particular B relay corresponding to the B digit of the calling line, which in this case is "1" (relay 3B1), is operated as a result of the operation of relay 20B1 to store the B designation of the calling line in the B register.

Thereafter, transmitter 71 is operated to deliver a train of pulses which illustratively are positive signals followed by open-circuit (or zero current) signals to energize and release relay 5P1 at the remote unit. In turn this results in the sequential operation of scan relays 30A1–30A6 and 3C1–3C9, respectively, in response to each interrogation pulse thus transmitted. As is apparent from the service request matrix 102, contacts of relays 30A–, in series with the multiline relays 20B–, are opened when the respective scanning relays are operated. In consequence, the operation of relay 30A1 results in the release of relay 20B1 which through control relays 110 delivers a negative signal (ground on the ring conductor) via the transmitter-receiver 104 indicating the A code designation of the calling line. Prior thereto, however, transmitter-receiver 104 is actuated to deliver a positive signal to the central office over the preselected speech trunk TK1 indicating the B code designation is "1" since the B digit registration ("1") is stored immediately upon the operation of the multiline relay 20B1. During the interim, stepping switches 111 and 112 have moved in synchronism with the remote scanning relays 30A– in response to control 712, all as explained in detail herein.

At this time the reception of the positive signal over the preselected trunk TK1 in the receiver 62 at the control unit delivers information to the control relays 712 to discontinue further stepping of switch 112 thereby resulting in a registration of the B digit in both the B digit register 107 in the remote unit and the quivalent B digit register (not shown) in the decoder 725 under control of stepping switch 112.

Thus, in summary, the A digit which in the assumed illustration is also "1" is stored in the A digit register 106 at the time that multiline relay 20B1 is released at the contacts of relay 30A1 and is also stored in the equivalent A digit register in the decoder 725 under control of stepping switch 111. In consequence, the A digit and the B digit are both "1" and are stored simultaneously at the remote unit in registers 106 and 107 and in similar registers at the decoder 725 in the central office. In this respect, the stepping switches 111 and 112 which represent the A digit and B digit are operated synchronously under control of transmitter 71 with the scan relays 30A– at the remote unit. Moreover, when transmitter 71 has delivered a number of pulses equal to the A digit of the calling line, the A digit is stored in the A digit register 106 at the remote unit, and a negative signal is returned by operation of relay 5W in the transmitter-receiver 104 which is received by relay 6N in receiver 62 to discontinue further stepping of switch 111 and to store the A digit indicated thereon in the decoder 725.

Similarly, when a number of pulses equal to the B digit are received, a positive signal is returned by transmitter-receiver 104 through the release of relay 5Y to operate relay 6P in receiver 62 and to discontinue further stepping of switch 112 thereby storing the B digit in the appropriate register of the decoder 725.

It will be noted in this respect that the interrogation signals themselves are originated at the central office and that the remote unit is merely returning a "terminate" or "conclude" order indicating that the appropriate number of pulses representing the A or B digit has been received. It is also important to observe that since in the illustrative example the A digit was "1" and the B digit was also "1" that the central office was apprised of this fact by separate positive and negative signal pulses delivered from the remote unit during the same interrogation pulse cycle.

If, for example, the A digit had been "4" and the B digit had been "2" representing line 10, the pattern of operation would have been similar except that the remote unit would have returned the A and B indicating signals to the central office in separate times frames. Thus, when the central office transmitter 71 had delivered two pulses to the remote unit, the B digit would have been stored in register 107 at the remote unit and a positive signal would have been returned over the preselected speech trunk TK1 to indicate to the central office that the calling line had a B code designation of "2." After two more pulses had been delivered by transmitter 71 to the remote unit, a negative signal would have been returned to indicate that the appropriate number of pulses representing the A digit 4 had been received and to discontinue stepping of switch 111. Under these circumstances, it is manifest that the first two pulses transmitted were ambivalent in that they represented both A digit information and B digit information. However, the ambivalence is resolved at the remote unit by transmission of either positive or negative signal indications over the preselected trunk in accordance with the code designation of the calling line.

Returning to the assumed illustration of line 1, the line identification is complete and stored in the registers 106 and 107 at the remote unit and corresponding registers in the decoder 725. The central office now is aware of the line identification and sufficient information is available to connect the calling line to the preselected trunk. This is accomplished by transmitting a signal over the control trunk which operates relay 5P1 and subsequently operates relay 5N1 to effectuate the connection through trunk relay tree 1 of the calling line 1 to the preselected trunk TK1.

At the central office end of the connection, the switching network 105 is energized in response to the A and B digit information stored in the decoder 725 to operate a particular vertical and horizontal magnet to effect a connection between trunk TK1 and the substation line terminations TO1 and RO1 in the "central office line and cutoff relays" 614 unique to calling substation 1. Since this termination is actually the termination to which the substation line would have been connected if, in fact, directly connected to the office rather than through a concentrator, the connection is now complete and is a true universal type of connection since the office need not recognize that the line is a concentrated line and not a direct connected line.

The preselected trunk TK1 is now exclusively engaged in the speech connection for line 1 and another trunk must be preselected by the central office. This function is performed by trunk selector 726. It is necessary to transmit the newly selected trunk identification to the remote unit in order that the transmitter-receiver 104, which in the interim is not connected to any trunk, be connected to the newly selected trunk. It will be assumed that trunk TK9 is the newly selected trunk. Using a procedure analogous to that described for line identification on an originating call, the transmitter 71 is energized to transmit positive pulses over the control trunk to operate and release relay 5P1. At this time stepping switch 113 is operated synchronously with the counting relays 3C1–3C9. At the conclusion of the ninth pulse, the central office transmits a negative signal over the control trunk to operate relay 5N1 and ultimately to effect the operation of trunk counter 114 to indicate that the selected trunk is TK9.

When the identity of the newly selected trunk is stored in the remote unit, the central office transmits a positive signal to reset trunk relay tree 9. This "reset" operation is relevant to the fact that trunk TK9 was previously connected to a particular line, for example the line 2 associated with cutoff relay 2CO2.

This is a feature of delayed disconnect operation as explained herein in detail. Briefly, "delayed disconnect" in line concentrator operation refers to the fact that upon the conclusion of a speech connection, the trunk over which the concentrated line was extended to the office is not disconnected from the line but remains connected thereto. After some "delay" and, in fact, when the trunk is required to serve another line, the trunk is disconnected from the line to which it was connected.

The resetting of trunk relay tree 9 under control of the office disconnects trunk TK9 from substation 2. Since it is assumed that the cutoff relays 2CO– at the remote unit are magnetically latching, as explained in my Patent 3,022,382, to conserve power, the cutoff relay contacts remain open and substation 2 is, in effect, "dead"—without dial tone or side tone. In fact, substation 2 will remain out of service until it is restored by a positive control action from the central office.

This is accomplished, as indicated herein in detail, by immediately restoring the cutoff relay (2CO2) for substation 2 as soon as the trunk relay tree 9 is released to disconnect the line 2 from trunk TK9.

At the outset it will be noted that since trunk relay tree 9 is released, the transmitter-receiver 104 now is once more connected to its counterpart transmitter and receiver 61 and 62 at the central office but this time over trunk TK9.

Since the remote unit does not keep a record of the line to trunk connections, it is necessary to identify the line 2 which was connected to trunk TK9. This is accomplished by a positive signal transmitted from the remote unit over trunk TK9 when the trunk relay tree 9 is released and connected to transmitter-receiver 104. The positive signal operates relay 6P at the remote unit and results in the application of a signal potential to the sleeve lead of the trunk TK9 which through the operated crosspoint in switch network 105 travels to the sleeve lead of the line connected to the trunk which in this case is line 2. The sleeve leads of all lines are extended to the encoder 727 which converts the line designation to the equivalent A and B code identifications suitable for transmission to the remote unit. The information delivered from encoder 727 representing the identity of substation 2 is transferred to the control relays 712 to energize transmitter 71 to outpulse the identity of substation 2 to the remote unit. Under these circumstances, however, the line identification is under control of the central office rather than the remote unit. The appropriate positive and negative signals to mark the A and B digits in the pulse train are this time delivered over the selected trunk TK9 by the central office to the remote unit rather than vice versa as in the case of the originating call. The reaction by the scanning relays and counting relays and the A and B registers 106 and 107 are similar to that described above for an originating call. Ultimately, the A and B digit identities of the substation line 2 are stored in registers 106 and 107 and a negative signal is transmitted over the control trunk to effectuate restoration of the cutoff relay 2CO2 through the cutoff relay control tree 101 in response to the particular A and B code designations, all as explained in detail herein. When relay 2CO2 is released, substation 2 is once more connectable to multi-line relay 20B1 and the line is restored to service. At this time the concentrator is adapted to handle additional service requests.

Terminating calls to a concentrated line are processed in substantially the same manner as that indicated for an originating call with the exception that line identification is transmitted to the remote unit in the manner explained for restoration of cutoff.

Having thus described the operation in general form, a detailed description follows. Understanding of this description will be facilitated by reference to the charts on FIGS. 9–13 and the table on FIG. 14.

In following the detailed relay operational paths and sequences and also the signaling between the central office unit and the remote unit, continuing and appropriate reference to FIGS. 10–13 will be useful. It will be noted in FIG. 10, for example, that the sequence chart shows the relay operations at the remote unit together with the direction of signal travel between the central office unit and the remote unit. In addition, the sequence chart graphically indicates which signals are delivered on the control trunk and which signals are delivered on the preselected speech trunk. Thus, as a result of the operation of relay 5Y in FIG. 10, an open circuit signal OS is delivered over the speech trunk to the central office. It will be noted, moreover, that the designations adjoining the arrowheads which include PC, OC, and NC respectively represent positive signal on the control trunk, open circuit signal on the control trunk, and negative signal on the control trunk.

The designations PS, OS, and NS respectively represent positive signal on the speech trunk, open circuit signal on the speech trunk and negative signal on the speech trunk. It will be seen that identical designations are utilized in FIG. 9 to indicate corresponding signals on the speech and control trunks.

Referring again to FIG. 10, it is seen that the operation of relay 5Y at the remote unit results in the delivery of a service request (open circuit signal) on the preselected speech trunk to the central office. Correspondingly, the interrogation pulses which are thereafter delivered from the central office are shown as a positive signal PC on the control trunk to cause the operation of relays 5P1 and 5P2 and associated relays, followed by the open circuit signal OC on the control trunk to release relays 5P1 and 5P2 and to operate relay 5P3 as well as perform other functions at the remote unit.

*Detailed description*

When line 22 goes off hook representing an originating call at substation 22, a relay will be operated to indicate the service request. Thus, a path may be traced from ground, contacts of relay 2CO22, tip conductor of the substation loop, substation 22, ring conductor of the substation loop, contacts of relay 2CO22, contacts of relays 30A4–30A6 in series, winding of relay 20B4, contacts of relay 3B5–3B8 in series, contacts of relay 5M to positive battery. Relay 20B4 is operated, and it will be noted in this respect that the same relay would have been operated if calls existed on any of the other substations 19–24. In this sense, relay 20B4 is a multiline relay shared by six substations (19–24).

The operation of line relay 20B4 results in the operation of a particular relay 3B– representative of a subgroup of the line identification, the other portion of which is represented by a particular relay 3A– which will be operated as explained infra.

Operation of relay 20B4 results in the operation of relay 3B4 over a path which may be traced from ground, contacts of relay 5R, contacts of relays 20B1, 20B2, 3B2, 20B3, 3B3, 20B4, winding of relay 3B4, contacts of relay 9B0, winding of relay 3SR, contacts of relay 5R to positive battery. Relays 3B4 and 3SR operate over this path. Operation of the relay 3RS results in the operation of relay 5Y over a path from ground, contacts of relays 5R, 3B0, additional contacts of relay 5R, winding of relay 5Y, further contacts of relay 5R, additional contacts of relay 3B0, contacts of relay 3A0, contacts of relay 5W, contacts of relay 3SR to positive battery.

Relay 50 is operated over a path which may be traced from ground, contacts of relay 5R, winding of relay 50, aditional contacts of relay 5R, contacts of relay 5M, contacts of relay 3SR to positive battery.

Operation of relay 5Y results in the transmission of a service request signal to the central office to alert the equipment thereat by interrupting the positive battery signal on the ring conductor at the contacts of relay 5Y. Previously a path existed from ground, contacts of relay 5W, contacts of relay 5Y, tip conductor 5T, trunk tree 2, tip conductor of trunk TK2 to the central office, contacts of relay 6TK2, diode 611, winding of relay 6P, contacts of relay 6TK2, ring conductor of trunk TK2 to the remote unit, trunk tree 2, conductor 5R, contacts of relay 5Y, contacts of relay 5W to positive battery.

*Calling line identification*

Transmission of the service request pulse to the central office over the path described above results in the release of relay 6P at the central office which in turn applies a ground condition to the control unit 712 to energize transmitter 71 to begin interrogation pulsing. The manner of energization of the transmitter 71 by the control unit is not essential to the present invention and is shown symbolically by the closure of switch 713 in the control relays.

Figure 5:
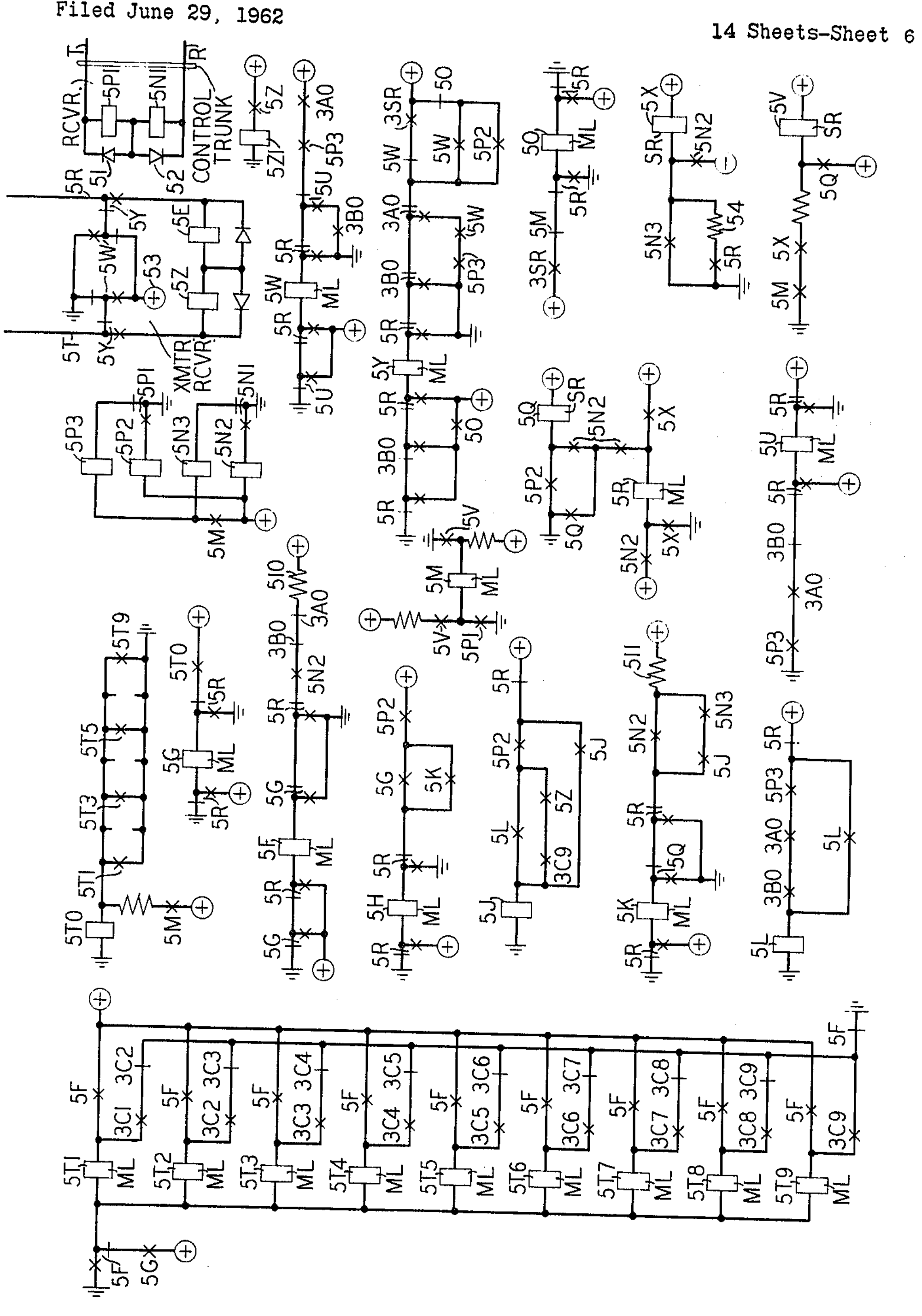
Figure 9:
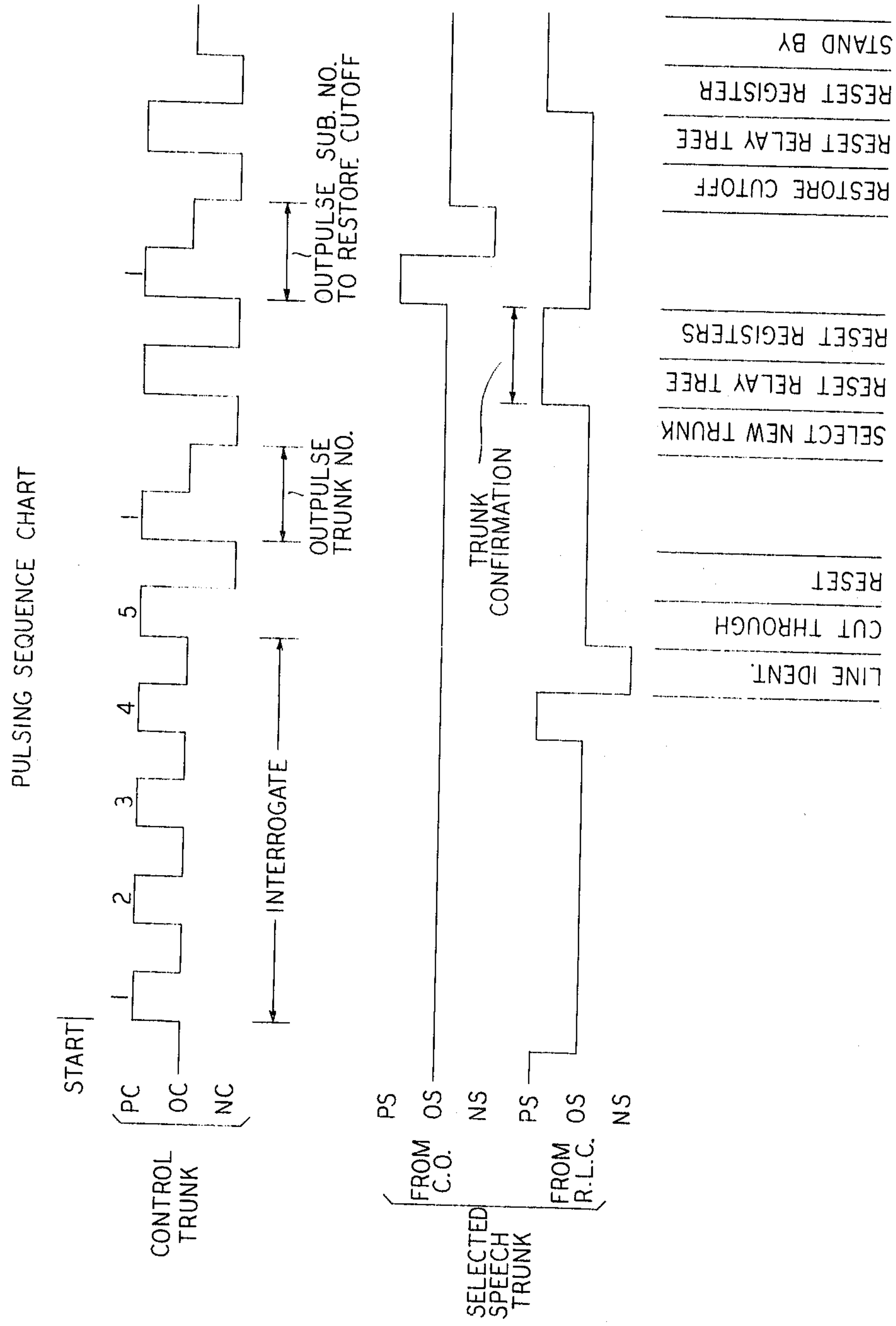
FIG. 9 is a graphical depiction of the control signals transmitted over the preselected speech trunk and the control trunk between the central office and the remote unit.
Figure 10:
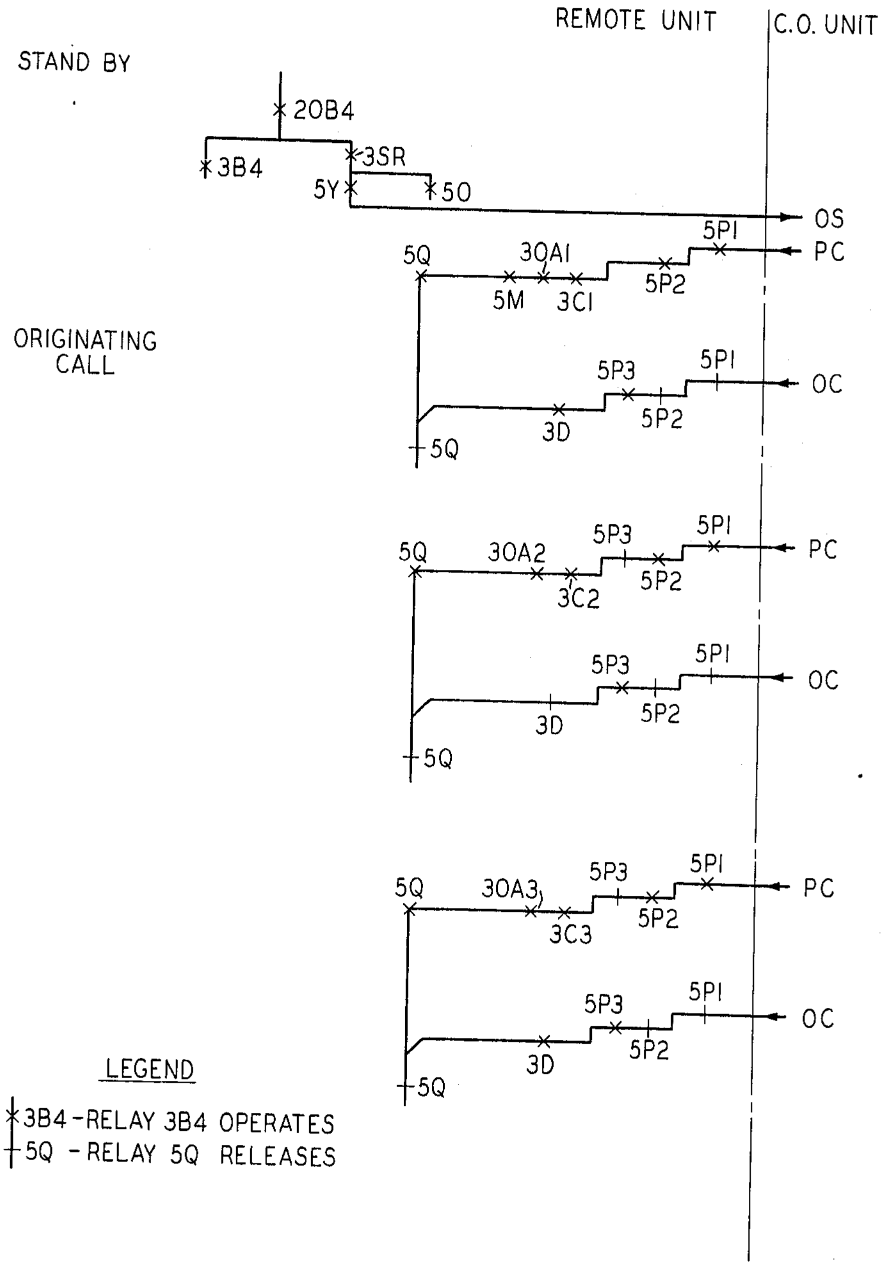
FIGS. 10–13 are a relay time sequence chart depicting the operation and release of relay equipment at the concentrator unit, and FIG. 14 discloses the A and B code for each line.
Figure 11:
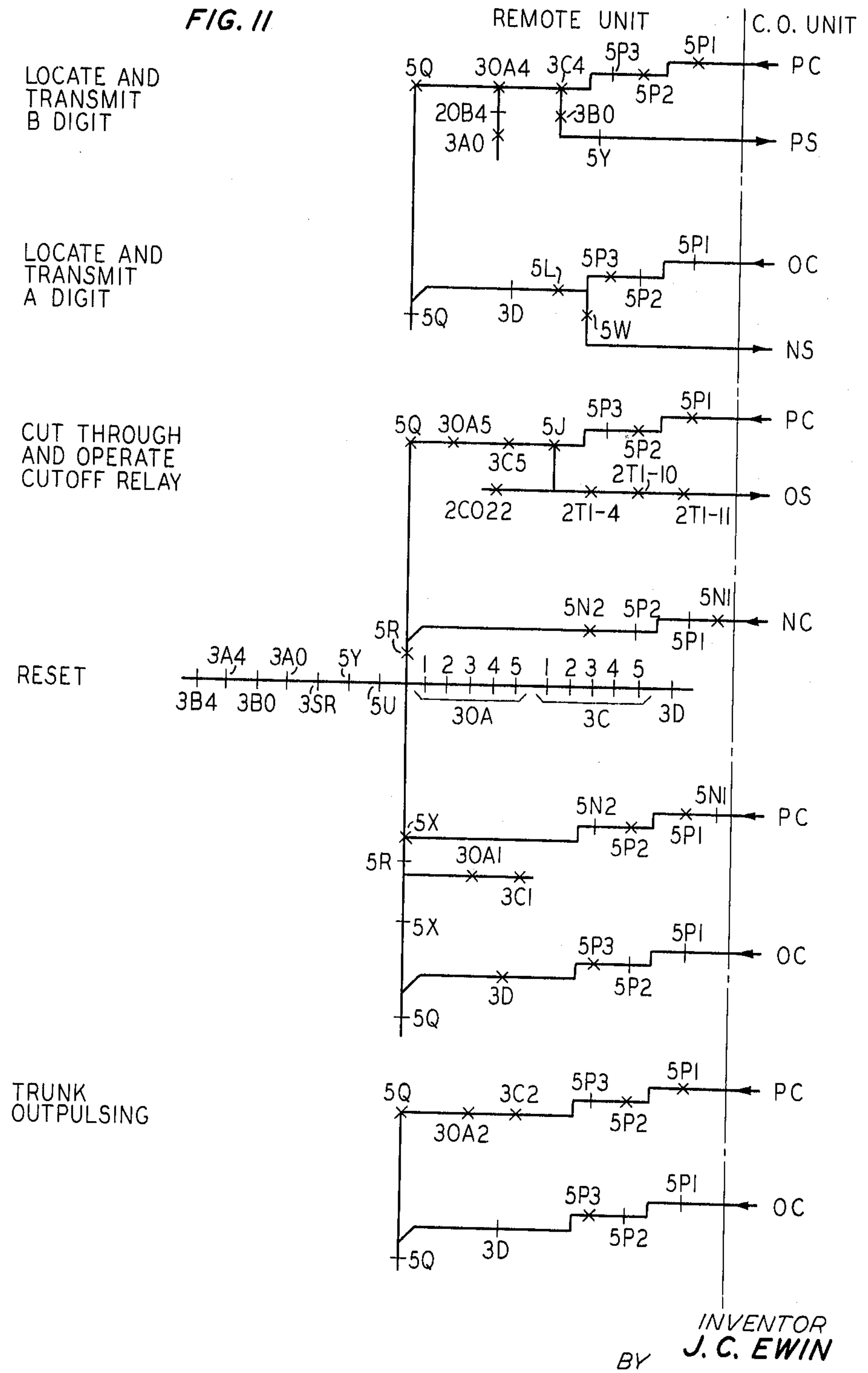
Figure 12:
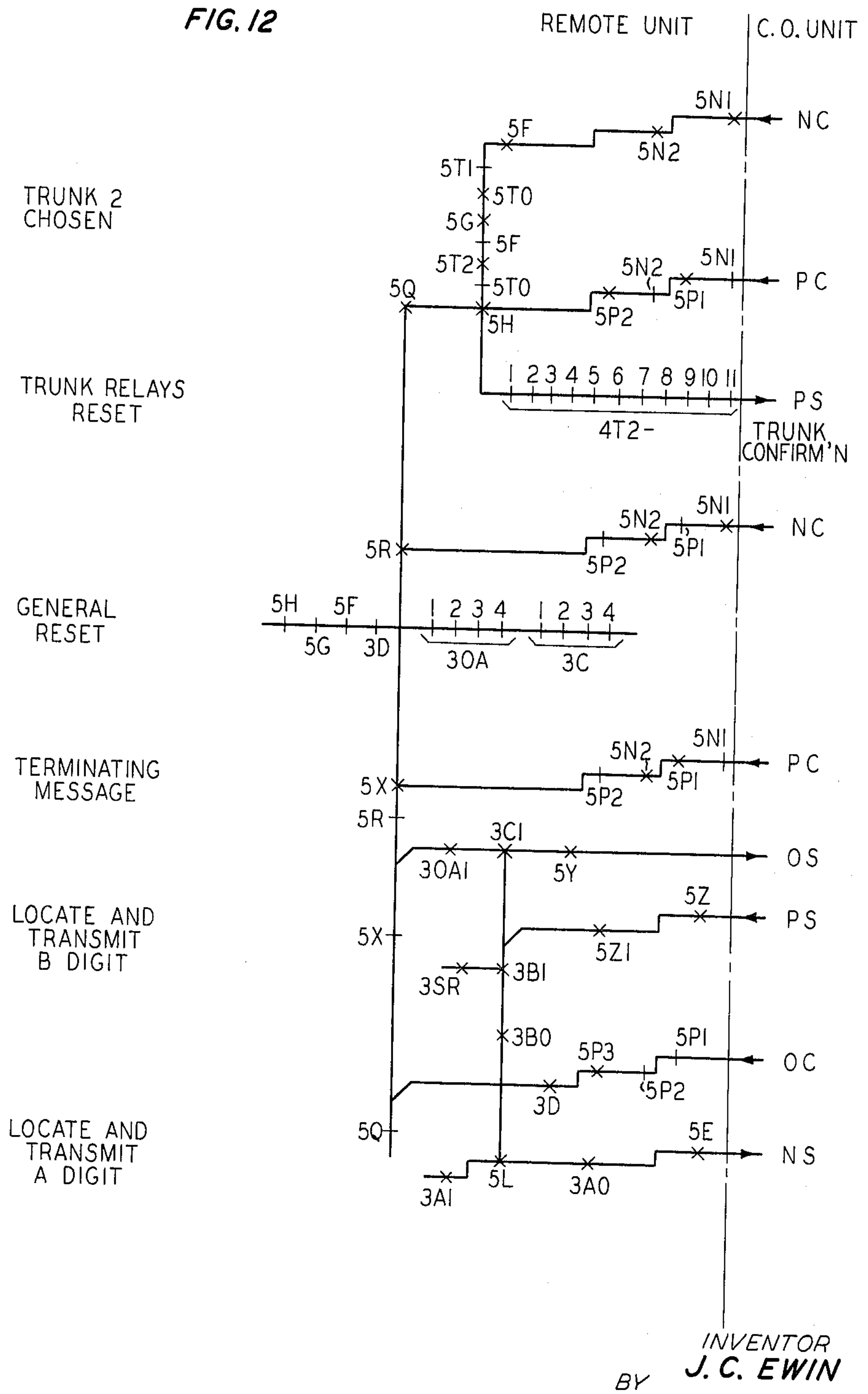
Figure 13:
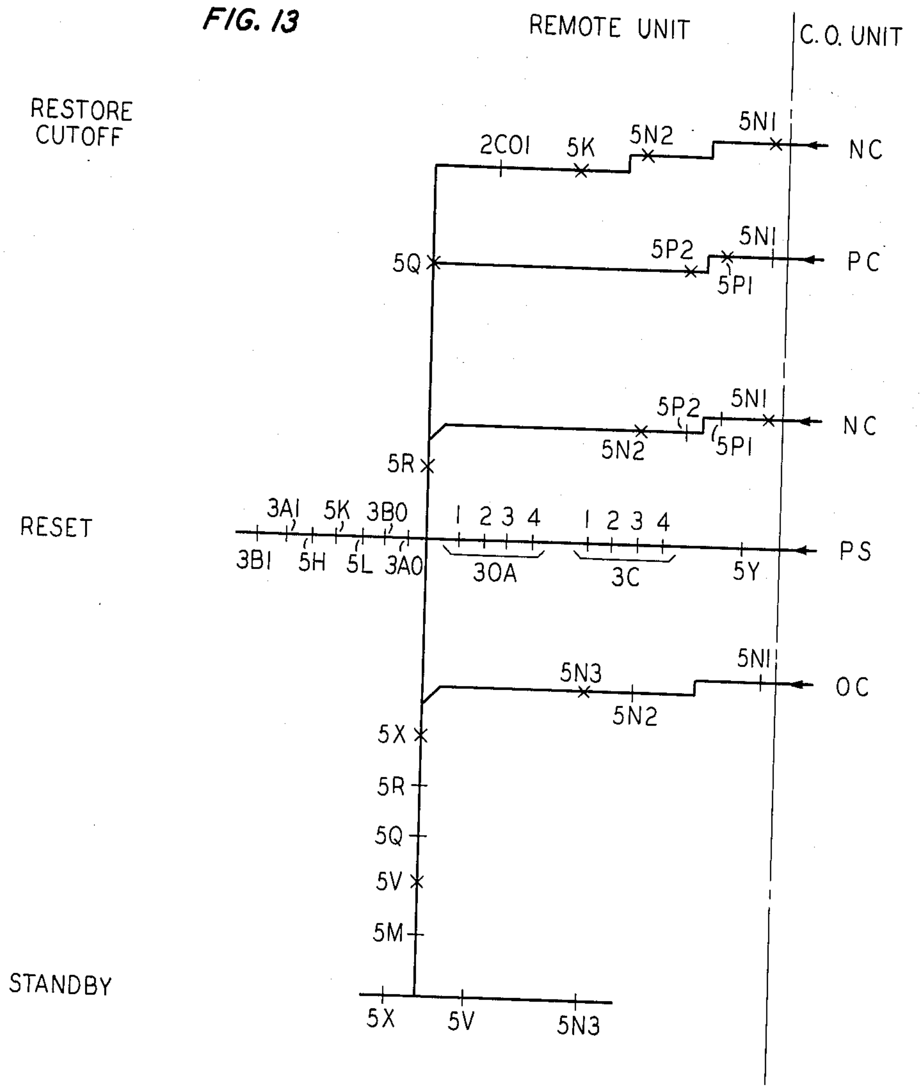

The pulses delivered by the transmitter 71 are designed as shown in FIG. 9 to provide positive signals over the preselected signaling path described above to operate relays 5P1 and 5N1 as required. Thus, transmitter 71 of FIG. 7 is energized to deliver periodic positive pulses over the tip and ring conductors of the control trunk to relays 5P1 and 5N1 in the receiver of FIG. 5. When the initial positive pulse is delivered, relay 5P1 is optrated in view of the back-biasing of diode 51 over a path including the tip conductor of the control trunk, winding of relay 5P1, diode 52, ring conductor of the control trunk to the transmitter 71. For simplicity this operation is shown symbolically as being performed by manual switch 72 although numerous well-known arrangements may be used under control of unit 712.

Operation of relay 5P1 results in the operation of relay 5P2 over an obvious path including the contacts of relay 5P1. Moreover, as a result of the first positive interrogating pulse, relays 30A1 and 3C1 are operated over a path including positive battery, contacts of relay 5R, windings of relays 30A1 and 3C1 in parallel, contacts of relays 3D, 5P2 and 5R to ground. At this time, relay 5M operates over a path including the contacts of relay 5P1, and relay 5Q operates over a path including the contacts relay 5P2. This constitutes the termination of relay operations at the remote unit in response to the positive signal portion of the interrogating pulse. Thereafter, as shown symbolically by switch 72 which is moved to a blank terminal 731, the control trunk is open circuited resulting in the release of relay 5P1 which in turn release relay 5P2. However, in view of the previews operation of relay 5M, a path now exists from ground, contacts of relay 5P1, winding of relay 5P3, contacts of relay 5M to positive battery to operate relay 5P3. Operation of the latter relay results in the operation of relay 3D over a path which may be traced from ground, contacts of relays 5R, 5P3, 3C8, 3C6, 3C4 and 3C2 in series, contacts of relay 3C1, winding of relay 3D, additional contacts of relay 3C1, additional contacts of relays 3C2, 3C4, 3C6 and 3C8 in series to positive battery. Release of relay 5P2 results in the release of relay 5Q over an obvious path which indicates the completion of the initial interrogation pulse.

Thereafter the transmitter 71 of FIG. 7, which may illustratively operate at twenty-five pulses per second, is again energized to deliver a positive pulse to the control trunk as shown symbolically by the operation of switch 71 to the positive source to again operate relay 5P1 over the path described for the initial interrogation pulse.

Again, relays 5P1 and 5P2 are operated but this time relay 5P3 is released at the contacts of relay 5P1. A path now exists for the operation of the scanning relays 30A2 and 3C2 over a path from positive battery, contacts of relay 5R, windings of relays 30A2 and 3C2 in parallel, contacts of relays 3C1, 3D, 5P2 and 5R to ground. Relay 5Q now operates at the contacts of relay 5P2. This completes the positive signal portion of the second interrogation pulse as shown in FIG. 9 and switch 72 is symbolically moved to the blank terminal indicating an open-circuit condition. As before, relays 5P1 and 5P2 release and relay 5P3 is operated. Relay 3D releases, however, at the contacts of relay 3C2 and relay 5Q releases at the contacts of relay 5P2, as described above, to complete the relay operation in consequence of the second interrogation pulse.

The third interrogation pulse which is initiated by the operation of manual switch 72 produces relay operations at the remote unit including relays 5P– which are the same as that described for the second interrogation pulse with the exception, however, that the third scanning relays 30A3 and 3C3 are operated over the contacts of relay 3C2. When the positive signal portion of the interrogating pulse is completed and the control trunk is open circuited, the signal relays release in the manner described for the second interrogation pulse but this time relay 3D is again operated over the contacts of relay 5P3 and the contacts of relay 3C3. Specifically this path may be traced from ground, contacts of relays 5R, 5P3, 3C8, 3C6, 3C4, 3C3, 3C2, 3C1, winding of relay 3D, additional contacts of relays 3C1, 3C2, 3C3, 3C4, 3C6 and 3C8 to positive battery. This completes the third interrogation pulse.

When the transmitter 71 is again returned to positive battery to initiate the fourth interrogation pulse, relays 5P1 and 5P2 are operated and relay 5P3 is released in the manner described in detail for the second interrogation pulse. Moreover, relays 3C4 and 30A4 are operated in a manner similar to that described for relays 3C3 and 30A3. In addition, relay 5Q is operated in the manner described for the third interrogation pulse.

However, at this time the operation of relay 30A4 results in the release of relay 20B4 in view of the opening of the contacts of relay 30A4 in series with relay 20B4. The release of relay 20B4 results in the operation of relay 3A0 which in turn operates relay 3A4 over a path which may be traced from ground, contacts of relay 5R, contacts of relays 3C5, 3C4, winding of relay 3A4, contacts of relays 3A3, 3A2, 3A1, 5R, 3A0 to positive battery. It will be noted that relay 3A0 was operated previously from positive battery, contacts of relay 5R, winding of relay 3A0, contacts of relay 50, contacts of relays 3B4, 20B4–20B1 in series, contacts of relay 5R to ground.

Relay 5W operates over the contacts of relay 3A0 and relays 5P3, 5U, 5R, winding of relay 5W, additional contacts of relays 5R, 5U to ground. Relay 3C4 causes relay 3B0 to operate and latch over a path from ground, contacts of relays 3C4, 3B4, 5R, winding of relay 3B0, additional contacts of relay 5R to positive battery. Operation of relay 3B0 causes the release (unlatching) of relay 5Y (previously latched). As a result of the release of relay 5Y, a positive signal is transmitted to the office over a path including ground, contacts of relay 5W, contacts of relay 5Y to the tip conductor of the selected trunk and over the path previously traced for the service request signal, back to the ring conductor of the trunk, contacts of relay 5Y, contacts of relay 5W to positive battery to operate relay 6P. The application of the ground condition to the tip conductor of the trunk 1 results in the registration at the central office of the B digit in response to the operation of relay 6P as shown symbolically by the opening of switch 731.

Thus, the B digit registration takes place during the positive signal portion of the fourth interrogating pulse to indicate at the central office that the B digit is 4. Heretofore the "A," "B" and "T" (trunk) counters have been stepped in synchronism in response to each operation of transmitter 71 as shown symbolically by switches 714–717.

Since in the illustrative example the A digit is also 4, upon the completion of the positive signal portion and the initiation of the open-circuit portion of the fourth interrogating pulse, relays 5P1 and 5P2 release in the usual manner while relay 5P3 operates and relay 3D releases. The operation of relay 5P3 results in the operation of relay 5W over a path including positive battery, contacts of relays 3A0, 5P3, 5U, 5R, winding of relay 5W, additional contacts of relays 5R and 5U to ground.

As a result of the operation of relay 5W, a negative signal is applied to the tip and ring conductors of the selected trunk over the contacts of relay 5W. Specifically, the operation of relay 5W results in the application of a positive potential from battery 53, contacts of relays 5W and 5Y to the tip conductor of the selected trunk while a ground condition is applied over the contacts of relays 5W and 5Y to the ring conductor of the selected trunk to operate relay 6N at the office.

Thus, a negative signal is transmitted to the central office to indicate the identification of the A digit in the register thereat in response to the operation of relay 6N as shown symbolically by the opening of switch 716. It is significant to note at this juncture that at this time the fourth interrogation pulse and the reactions thereto are complete and moreover that the A digit information was transferred to the central office as well as the B digit information during the same interrogation pulse although in separate portions thereof.

Summarizing briefly, as a result of the line off-hook, condition, a particular multiline relay 20B4 was operated and in turn operated relay 3B4. Subsequently, relay 5Y delivered a no-voltage condition to the central office to indicate a service request. Interrogation pulses were then received at the remote unit to operate the scan relays and counter relays 30A– and 3C– concurrently. When the scan relay corresponding to the B digit of the requesting line operated, namely relay 30A4, the multiline relay 20B4 released and transmitted a positive signal to the central office to identify the B digit thereat. Subsequently the A digit was transmitted to the central office as a negative signal to identify the A digit at which time complete information is available in the remote unit to identify the A and B subgroups of the line identification. At this time the concentrator proceeds to operate the trunk relays to connect the preselected trunk to the identified line in a manner described in detail in my above-referred-to patent.

*Connection of calling line to preselected trunk*

As indicated above, the control circuitry is now operated to energize the trunk relays of the preselected trunk to connect substation line 22 to the trunk. Simultaneously the cutoff relay for line 22 (relay 2CO22) is operated through contacts on the selected relays 3A– and 3B– and ultimately a reset signal from the central office restores all of the common equipment.

Specifically, after the operation of the relays 3A4 and 3B4, as described above, relay 5L is operated over a path from ground, winding of relay 5L, contacts of relays 3B0, 3A0, 5P3, 5R to positive battery.

On the initiation of the fifth interrogation pulse, relays 5P1 and 5P2 are operated and relay 5P3 is released in the manner described above. At this time relay 5J is operated from ground, winding of relay 5J, contacts of relays 5L, 5P2 and 5R to positive battery. In addition, relays 30A5 and 3C5 are operated over the contacts of relay 5P2 and relay 5Q is operated as described above. Since it is assumed that the preselected trunk is trunk No. 1, relay 5T1 is in the operated condition and as a result the operation of relay 5J extends a path in FIG. 2 from positive battery over the contacts of relay 5J to operate relays 2T1–4, 2T1–10 and 2T1–11 according to the setting of the translation network shown in the upper left hand corner of FIG. 3. Moreover, a path is extended for the operation of relay 2CO22 which may be traced from positive battery, contacts of relays 5J, 5K, 3A4, 3B4, winding of relay 2CO22, contacts of relays 5K to ground. In consequence of the operation of relays 2T1–4, 2T1–10 and 2T1–11, a path may be traced in the trunk tree 1 of FIG. 2 from the tip conductor of trunk 1, contacts of relays 2T1–11, 2T1–10, 2T1–9 and 2T1–4 to the tip conductor of substation 22. A similar path may be traced between the ring conductor of the trunk and the ring conductor of the substation. At the central office the trunk 1 is connected to the conventional termination in the office unique to line 22 included in outline form at 614. The manner of connection in the office is not shown in detail as unessential to the present invention but includes the selection of a hold magnet HM22 unique to line 22 through the decoder 725 after the storage of the A and B digits. The decoder, which is shown in outline form may be similar to that shown in FIG. 2 for the cutoff relays 2CO1–48 or may illustratively take the form shown for corresponding equipment in my above-referred-to patent.

Prior to the operation of the hold magnet HM22 by the decoder 725 select magnet SM1 for trunk 1 is operated by trunk selector 726 as shown symbolically by the lower arm of stepping switch T. Release of relay 7TK1 as shown symbolically by the opening of manual switch 728 disconnects the trunk from signaling equipment at the office and connects it to the line termination 22 to complete the calling connection. For a comprehensive description of the operation of detailed equipment suitable for connecting the trunk to the central office line termination, reference may be made to my patent referred to above.

The operation of relays 2CO22, 2T1–4 and 2T1–10 results in the transmission of an open circuit signal to the central office in view of the disconnection of trunk 1 from the signaling circuit.

At this time a signal is delivered from the transmitter 71 at the central office as shown symbolically by the operation of manual switch 72 to deliver a negative signal over the control trunk to operate relays 5N1 and 5N2 and to release relays 5P1 and 5P2. The operation of relay 5N2 results in the operation of relay 5R over a path including ground, contacts or relays 5Q and 5N2, winding of relay 5R, additional contacts of relay 5N2 to positive battery.

The operation of relay 5R results in the release of relays 3B4, 3A4, 3B0, 3A0, 3SR, 5Y, 5U, 30A1–30A5, 3C1–3C5 and relay 3D.

*Transmission of newly selected trunk number to remote unit*

At this juncture the calling line has been connected to the preselected concentrator trunk 1 and it now remains necessary for the central office unit to select an additional trunk and to transmit information to the remote unit corresponding to the newly preselected trunk number. The central office identifies an idle trunk for preselection and initiates the outpulsing of the preselected trunk number symbolically through the operation of manual switch 72 which is actuated to deliver a positive signal over the control trunk. As usual, relays 5P1 and 5P2 are operated and relays 5N1 and 5N2 are released. Scanning and counter relays 30A1 and 3C1 are operated and relay 5X is operated over the contacts of relay 5R to release relay 5R. Relay 5X releases at the contacts of relay 5R to complete the positive signal portion of the interrogation pulse. When the manual switch is again actuated to initiate the open-circuit portion of the interrogating pulse, relays 5P1 and 5P2 are released and relay 5P3 is operated. Relay 3D operates as does 5Q in the manner described above.

The central office now delivers an additional interrogation pulse and equivalent operations take place in the remote unit which ultimately result in the operation of relays 30A2 and 3C2.

The specific manner of trunk selection is not essential to an understanding of the present invention and reference may be made to my Patent 3,022,382, referred to above, for a suitable trunk selector. For purposes of illustration it will be assumed that trunk 2 is the newly selected trunk as shown symbolically by the movement of the upper arm of switch T to terminal 2.

Since trunk 2 is the newly preselected trunk, the office now transmits a negative signal over the control trunk to operate relays 5N1 and 5N2. At this time relay 5F operates over a path including ground, contacts of relays 5G, 5R, winding of relay 5F, additional contacts of relays 5G and 5R, contacts of relays 5N2, 3B0, 3A0, resistance 510 positive battery. Operation of relay 5F results in the release of the previously operated trunk relay 5T1 at the contacts of relay 5F in series therewith. At this time relay 5T0 also operates in view of the opening of the contacts of relay 5T1. Operation of relay 5T0 results in the operation of relay 5G over a path from ground, contacts of relay 5R, winding of relay 5G, additional contacts of relay 5R, contacts of relay 5T0 to positive battery. Operation of relay 5G in turn results in the release of relay 5F. Relay 5F, in releasing, permits the operation and magnetic latching of the newly selected trunk relay 5T2 over a path including ground, contacts of relays 5F, 3C3, 3C2, winding of relay 5T2, contacts of relays 5F and 5G to positive battery. Relay 5T2, in operating, results in the release of relay 5T0.

Figure 3:
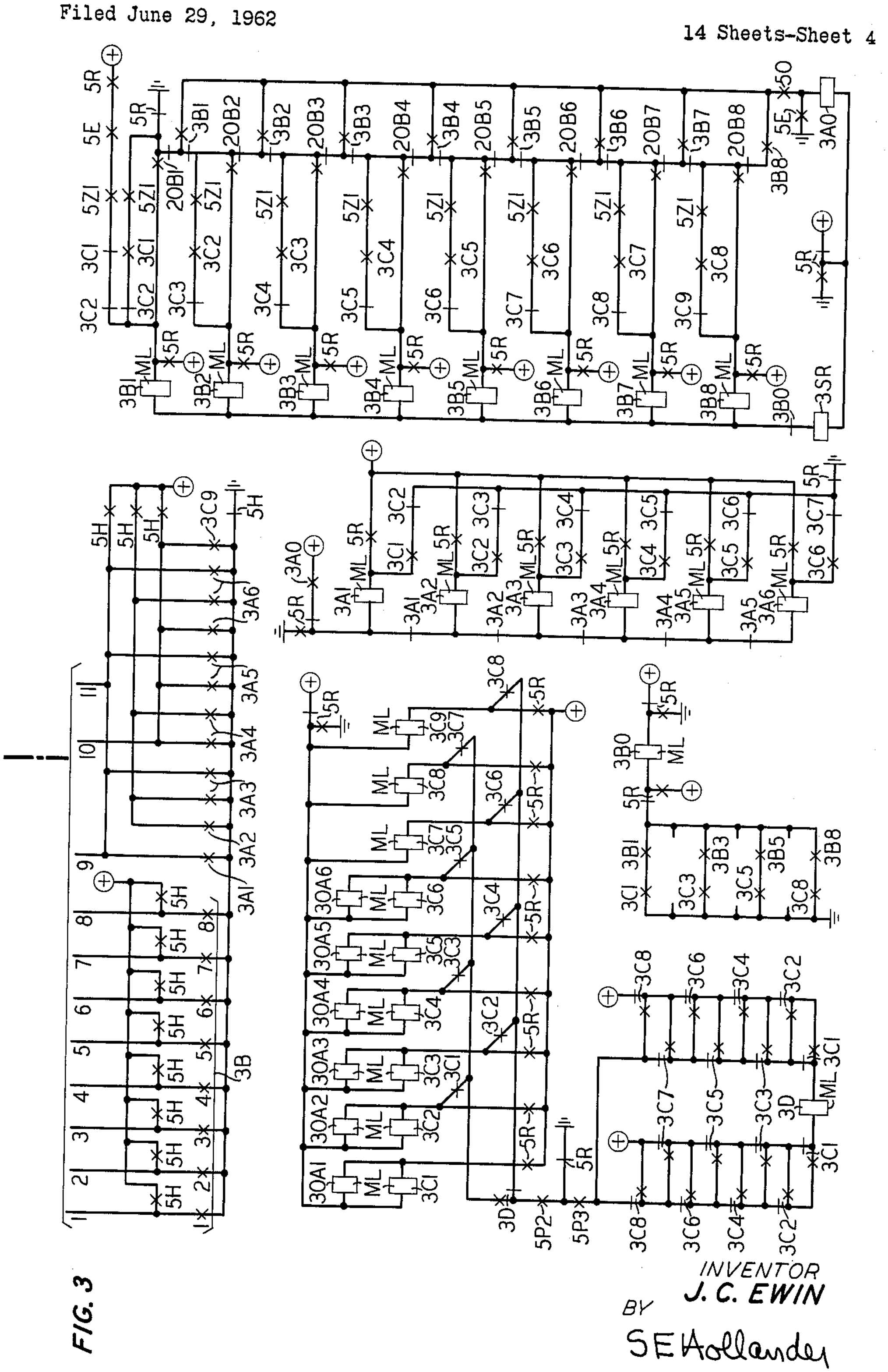
Figure 4:
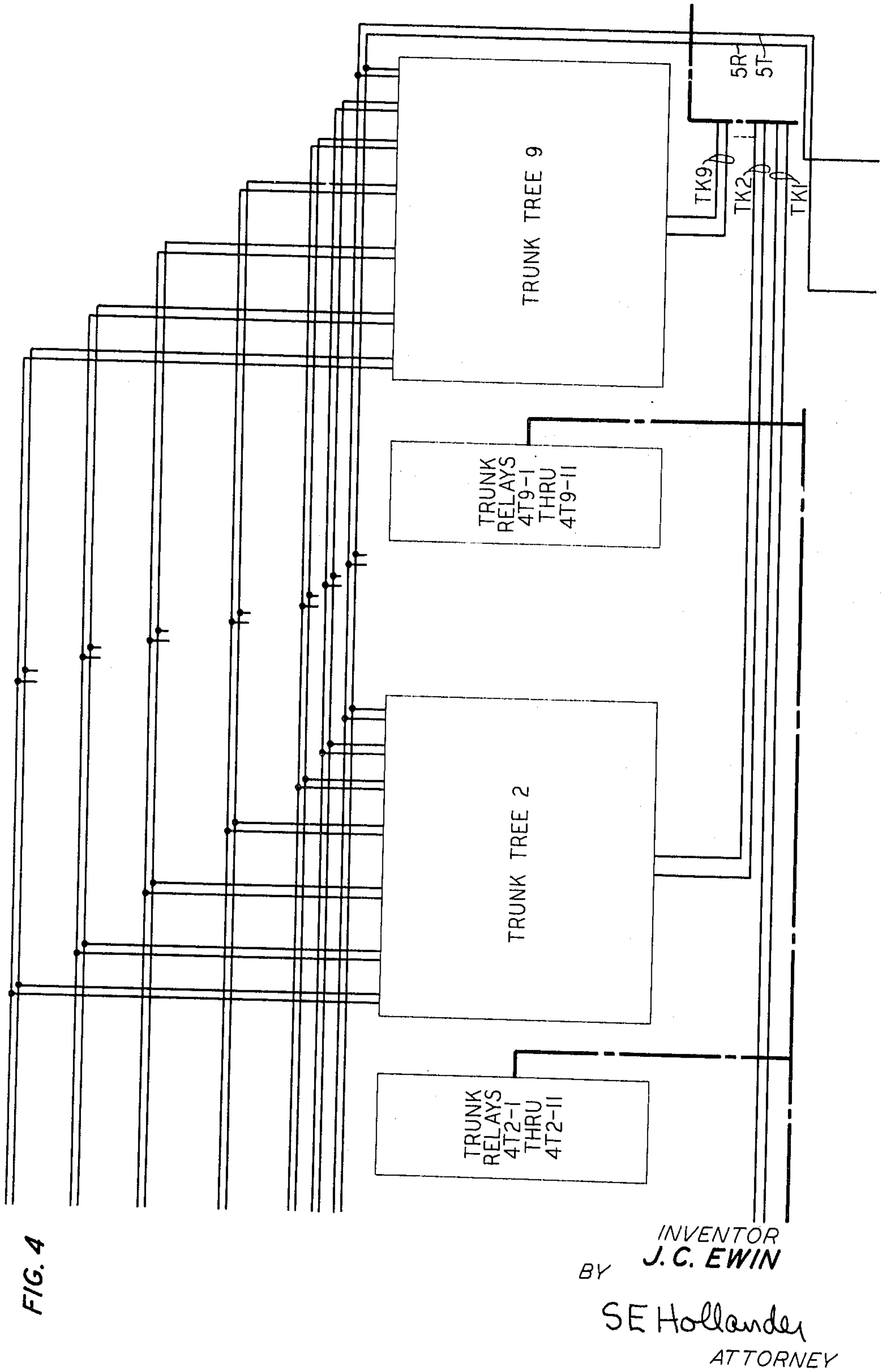

The office unit of the concentrator now delivers a positive signal over the control trunk from transmitter 72. Relay 5N1 is released as is relay 5N2 and relays 5P1 and 5P2 are operated. Relay 5H operates from ground, contacts of relay 5R, winding of relay 5H, additional contacts of relay 5R, contacts of relays 5G and 5P2 to positive batter. Relay 5Q operates in the usual manner and the trunk relays 3T2–1 through 3T2–11 associated with trunk tree 2 in FIG. 3 are all released thereby delivering a positive signal to the central office in view of the connection of the signaling circuit in the remote unit to the newly selected trunk 2. The trunk relays 3T2–1 through 3T2–11 are not shown in detail to preserve clarity but are in the same format as relays 2T1–1 through 2T1–11 for trunk 1.

The central office now delivers a negative signal over the control trunk to operate relays 5N1 and 5N2 and release relays 5P1 and 5P2 in turn operating relay 5R in the manner described above. This results in the resetting of the operated relays 30A– and 30C– as well as 5F, 5G, 5H and 3D. At this juncture in the operation, it will be noted that although the trunk 2 (the newly preselected trunk) has been disconnected from the line to which it was previously coupled, the line itself has not been restored to service since the cutoff relay for the line remains operated. Thus, as seen from FIG. 2 (and assuming the line to be line 1), the contacts of the cutoff relay 2CO1 in series with the operating path for the multiline relay 20B1 prevent the operation of the multiline relay in response to a service request on the line. In consequence, until specific action is taken to restore the line to a service condition, it is, in effect, a "dead" line since it is isolated from connection to any trunk and will not receive dial tone.

*Restoration of cutoff relay*

The identification of substation 1 is illustratively derived from the positive signal delivered to the central office at the time of release of relays 3T2–1 through 3T2–11 as explained above. This signal which operates relay 6P is utilized in the control unit 712 by means not shown but explained in detail in my Patent 3,022,382 to apply a signal to the sleeve conductor of newly selected trunk 2. This procedure is shown symbolically by the operation of switch 718 in the control unit. The ground condition thus applied travels over the sleeve conductor of the trunk 2 through the operated crosspoint 617 and the sleeve conductor of line 1 to the encoder 727 shown in outline form. A suitable encoder for this purpose is shown in detail in my Patent 3,022,382. The encoder 727 responds to the energized sleeve conductor S1 to operate particularly "A" and "B" relays uniquely representative of line 1 as shown symbolically by the operation of manual switches 729 and 730 to energize relays 7A1 and 7B1.

Thereafter the identity of the line is transmitted to the remote unit over the preselected trunk.

Specifically, switch 72 is operated to transmit an interrogating pulse which operates relays 5P1 and 5P2 at the remote unit in the manner described above and also operates relay 5X over a path from ground, contacts of relay 5R, resistance 54, winding of relay 5X to positive battery. Operation of relay 5X results in the release of relay 5R over an obvious path. Relays 30A1 and 3C1 are operated, as described above, as is relay 5Y. The latter relay operates over a path including contacts of relays 5R, 3B0, 5R, winding of relay 5Y, contacts of relays 5R, 3B0, 3A0, and 5P2. The operation of relay 5Y transmits an open circuit signal to the central office over the newly preselected trunk. Release of relay 5R results in the release of relay 5X also over an obvious path.

At this time the central office transmits a signal to the remote unit to indicate that the "B" identity of the line to be restored is "1." The central office transmits a positive signal over the newly selected trunk as shown symbolically by the operation of switch 621 in transmitter 61 to the positive potential source to operate relay 5Z at the remote unit as well as relay 5Z1. Operation of relay 5Z1 results in the operation of relay 3B1 over a path including ground, contacts of relays 5R, 5Z1, 3C1, 3C2, winding of relay 3B1, contacts of relay 3B0, winding of relay 3SR, contacts of relay 5R to positive battery. Relays 3B1 and 3SR operate over this path. Relay 3B0 now operates over the contacts of relays 3C1, 3B1, contacts of relay 5R, winding of relay 3B0, additional contacts of relay 5R to positive battery. Thus the B digit identification of the line to be restored is registered in the B digit register at the remote unit. This completes the reactions at the remote unit in response to the positive signal portion of the interrogating pulse and now the central office, as usual, transmits an open circuit signal by the movement of switch 72 to the blank terminal.

As a result, relays 5P1 and 5P2 release and relays 5P3 and 3D are operated, all in the manner described above. The central office now transmits a negative signal over the newly selected trunk from transmitter 61 in response to the control unit 712 which in turn is responsive to the information relating to the A digit stored in the encoder 727 to indicate to the remote unit that the A digit is "1." Specifically, switch 621 is moved to the negative battery source to transmit a negative signal over the trunk to operate relay 5E at the remote unit, in turn resulting in the operation of relay 3A0 over a path from positive battery, contacts of relay 5R, winding of relay 3A0, contacts of relay 5E to ground. At this time relay 5L is operated from ground, winding of relay 5L, contacts of relays 3B0, 3A0, 5P3 and 5R to positive battery. The A digit register is now operated to indicate the A digit 1 over a path including positive battery, contacts of relays 3A0, 5R, winding of relay 3A1, contacts of relays 3C1, 3C2 and 5R to ground. Relay 3A1 is operated over this path to complete the identification of the line having a cutoff relay requiring restoration.

With the operation of relays 3B1 and 3A1, complete identification is available at the remote unit of the line to be restored to service.

Consequently, at this time, the control unit at the office delivers an order to restore cutoff represented by a negative signal on the control trunk through the operation of switch 72 to the negative battery source to operate relays 5N1 and 5N2 at the remote unit. Relay 5K is now operated from ground, contacts of relay 5R, winding of relay 5K, contacts of relay 5Q, additional contacts of relay 5R, contacts of relay 5N2, resistance 511 to positive battery. Operation of relay 5K reverses the current applied to the magnetically latching cutoff relay 2CO1 to release the relay in a manner analogous to that described in my Patent 3,022,382. Specifically, relay 5K reverses the current to relay 2CO1 over a path including the contacts of relay 5K, contacts of relays 3A1, 3B1, winding of relay 2CO1, additional contacts of relay 5K to negative battery. This path applies a current to relay 2CO1 opposite in direction to that which was used to operate the relay thereby causing its release.

It may be noted at this point in the operation that the newly preselected trunk 2 has now been disconnected from line 1 to which it was previously connected and reconnected instead to the signaling equipment at the remote unit and at the control unit in the central office. Moreover, line 1 itself previously connected to trunk 1 has now been restored to service through the release of the cutoff contacts of relay 2CO1. Line 1 is now permitted to initiate additional calls through the operation of multiline relay 20B1 in the manner described above for line 22.

It remains necessary at this time to reset the common equipment in the concentrator. To do so the office transmits first a positive signal, then a negative signal over the control trunk to operate relays 5N1 and 5N2 and to release relays 5P1 and 5P2. Relay 5R now operates over a path including ground, contacts of relays 5Q, 5N2, winding of relay 5R, contacts of relay 5N2 to positive battery.

The operation of relay 5R results in the release of the operated relays 3B– and 3A– as well as relays 30A1–30A4, 3CI–3C4, 5Y, 5H, 5K, 5L, 3A0 and 3B0.

Having reset the common equipment in the concentrator, the central office now delivers an open circuit signal by operating switch 72 to release relays 5N1 and 5N2 and to operate relay 5N3 over paths described in detail above. The operation of relay 5N3 results in the operation of relay 5X over an obvious path which latter relay releases relay 5R and relay 5Q. Relay 5V is operated over the contacts of relays 5M and 5X. Relay 5M is released at the contacts of relay 5V in turn releasing relays 5V and 5X. Moreover, relay 5N3 is released at the contacts of relay 5M.

It will be noted that the use of relay 5M permits the remote unit to be in the standby condition with no relays drawing power. Thus relays 5P3 and 5N3 operate only when the remote unit is engaged in processing a call as a result of the contacts of relay 5M in series therewith.

With the release of relay 5N3, the control equipment is returned to a standby condition to await additional service request calls.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrator system including a central office, a plurality of substation lines, a lesser plurality of trunks extending from said office, concentrator means for connecting said lines to said trunks under control of said office, said trunks including speech trunks and a control trunk, means for preselecting a speech trunk next to be connected to a calling line, and signalling means at said concentrator means and said central office including said control trunk and said preselected one of said speech trunks for transferring signals indicative of said calling line.

2. A telephone line concentrator system including a telephone central office, a plurality of remote substation lines, a lesser plurality of trunks extending from said office, remote concentrator means for connecting said lines to said trunks under control of said office, a plurality of service request indicating means at said remote concentrator means respectively operative in response to unique groups of calling ones of said lines, means at said concentrator means for preselecting a trunk next to be connected to a calling line, and means effective upon the operation of said service request indicating means for transmitting a service request signal and calling line identification signals to said central office over a path including said preselected one of said trunks.

3. A universal telephone line concentrator system including a telephone central office, a plurality of remote substation lines, a lesser plurality of trunks extending from said office, remote concentrator means for connecting said lines to said trunks under control of said office, means in said concentrator means for establishing a selection preference for connection of said trunks to said lines, said last-mentioned means including means for preselecting a trunk next to be connected to a calling line, service request indicating means at said concentrator means, and means effective upon the operation of said service request indicating means for transmitting a service request signal to said central office over said preselected trunk.

4. A telephone line concentrator system including a telephone central office, a plurality of remote substation lines, a smaller plurality of trunks extending from said office, remote concentrator means for connecting said lines to said trunks under control of said office, service request indicating means in said remote concentrator means for transmitting a service request indicating signal to said central office representing a calling condition on one of said lines, scanning means at said remote concentrator means, means at said central office effective upon the reception of a service request indicating signal for sequentially advancing said scanning means, and means at said remote concentrator means responsive to the advance of said scanning means to deliver line identification signals to said central office indicative of the identity of the calling line.

5. A signaling system for a telephone line concentrator including a telephone central office, a plurality of substation lines, a lesser plurality of trunks extending from said office, remote concentrator means for connecting said lines to said trunks under control of said office, means in said concentrator means for preselecting differing ones of said trunks on successive calling connections, and signaling means for transmitting information between said concentrator means and said office including a signal transmission path comprising a particular same one of said trunks and said preselected one of said trunks.

6. A universal telephone line concentrator system including a telephone central office, a plurality of remote substation lines, a lesser plurality of trunks extending from said office, remote switching means for connecting said lines to said trunks under control of said office, signaling means for transferring information between said concentrator and said office including pulsing means for delivering a train of pulses from said office to said remote switching means indicative of the information to be transmitted wherein said individual pulses in said train represent distinct subgroups of said information to be transmitted to said office.

7. A universal telephone line concentrator system including a plurality of remote substation lines, a telephone central office, a lesser plurality of trunks extending from said office, a remote concentrator unit for connecting said lines to said trunks under control of said office, and signaling means for transmitting information between said office and said concentrator including transmitting means at said office for delivering a train of pulses representative of the identification to be transmitted wherein certain of said individual pulses in said train represent ambivalent indications including distinct subgroups of the identification to be transmitted and other individual pulses in said train represent monovalent indications including only a single subgroup of said identification to be transmitted.

8. A telephone line concentrator signaling system including a plurality of substation lines, a telephone central office, a lesser plurality of trunks extending from said office, switching means remotee from said office for connecting said lines to said trunks under control of said office, signaling means at said office and said remote switching means for transmitting signals between said switching means and said office, said signaling means including pulsing means for delivering trains of pulses in which individual pulses represent ambivalent indicia indicative of distinct subgroups of the identification to be transmitted, and additional means at said remote switching means and said office for resolving the ambivalance in said pulses.

9. A telephone line concentrator signaling system in accordance with claim 8 wherein said means for resolving said ambivalance includes means at said remote switching means responsive to the reception of a train of pulses indicative of a particular subgroup identification stored at said remote switching means for transmitting a signal to said central office indicative thereof.

10. A telephone line concentrator signaling system in accordance with claim 9 wherein said means at said remote switching means for transmitting said signal includes means for transmitting a signal of a first polarity indicative of a first subgroup identification and a signal of a second polarity indicative of a second subgroup identification.

11. A remote line concentrator system including a plurality of remote substation lines, a telephone central office, a smaller plurality of speech trunks extending from said office, a remote switching unit for connecting said lines to said trunks under control of said office, means at said unit for preselecting a particular speech trunk next to be connected to a calling one of said lines, means at said remote switching unit responsive to an off-hook condition on one of said lines representing an originating call for delivering a service request signal over said preselected one of said speech trunks to said central office, and means at said central office responsive to said service request signal for transmitting interrogation signals to said remote unit to ascertain the identity of said service requesting line.

12. A remote line concentrator system in accordance with claim 11 wherein said means at said central office for transmitting said interrogation signals includes a control trunk over which said interrogation signals are transmitted from said central office to said remote unit.

13. A remote line concentrator system in accordance with claim 12 including additional means at said remote unit responsive to the reception of a number of interrogating pulses representative of the code designation of said calling line for transmitting a revertive signal indicating the identity of said line over said preselected speech trunk.

14. A remote line concentrator system in accordance with claim 13 wherein said additional means at said remote unit includes means for transmitting distinct subgroups of the identification of said calling line including means for transmitting a first polarity pulse indicative of a first subgroup of said line identification and a second polarity pulse indicative of a second subgroup of said line identification in a variable order determined by said respective subgroup identifications.

15. A remote line concentrator system in accordance with claim 14 wherein said additional means includes means for transmitting said first and second polarity pulses in response to the same interrogation pulse when said first and second subgroup identifications are equal.

16. A universal telephone line concentrator system including a central office, a plurality of remote substation lines, a lesser plurality of trunks extending from said office, remote concentrator means for connecting said lines to said trunks under control of said office, means in said central office responsive to an off-hook condition on one of said lines for connecting said line to a preselected one of said trunks, additional means for preselecting another of said trunks to serve a subsequent calling line, binary signaling means for transmitting binary signals to said remote concentrator means indicative of the identity of the newly selected trunk, and additional means in said office responsive to an off-hook condition on another of said lines for energizing said binary signaling means to transmit said binary signals as interrogation pulses to said remote concentrator means to ascertain the identity of said off-hook line.

17. A universal telephone line concentrator signaling system including a plurality of substation lines, a telephone central office, a lesser plurality of trunks extending from said office, switching means remote from said office for connecting said lines to said trunks under control of said office, signaling means at said office and said remote switching means for transmitting signals between said unit remote switching means and said office, sensory means at said remote switching means individual to groups of said lines and responsive to service request indications on said lines for transmitting service request signals to said central office, cutoff means at said remote switching means individual to said lines and responsive to the connection of said lines to said trunks to disconnect said lines from said sensory means, means at said central office responsive to the disconnection of one of said lines from one of said trunks for energizing said signaling means to transmit signals to said remote switching means indicative of the identity of said one line, said means for energizing said signaling means including means to transmit a series of pulses in which individual pulses represent ambivalent indicia representative of distinct subgroups of the identification of said one line, and means at said remote switching means responsive to the reception of said identification for operating said cutoff means to reconnect said sensory means to said substation lines.

18. A concentrator signaling system including a plurality of substation lines, a telephone central office, a plurality of speech trunks extending from said office, a con- means for connecting said speech trunks to said lines under control of said office, means in said office for preselecting one of said speech trunks for connection to a calling line, means at said central office responsive to a trol trunk extending from said office, remote switching calling condition on one of said lines for transmitting a train of pulses to said central office over said control trunk wherein the individual pulses in said train may represent two distinct subgroups of the line identification, means at said remote switching means responsive to the reception of a number of pulses indicative of one of the two said subgroups for transmitting a signal over said preselected speech trunk to said central office to register said subgroup of said identification thereat, and means responsive to the reception of a number of said pulses indicative of the other subgroup of said line identification for transmitting a signal of opposite polarity over said preselected speech trunk to store said other portion of said line identification at said central office.

19. A concentrator signaling system including a plurality of substation lines, a telephone central office, a plurality of trunks extending from said office, remote switching means for connecting said lines to said trunks under control of said office, means for preselecting one of said trunks for connection to a service requesting line, means in said central office and said remote switching means responsive to the termination of a speech connection over one of said lines and trunks for maintaining said connection between said line and said trunk, and means responsive to the selection of said trunk as the preselected trunk for disconnecting said trunk from said line and for delivering a signal to said central office over said newly preselected trunk indicative of the release of said newly preselected trunk from said line.

References Cited by the Examiner

UNITED STATES PATENTS

| | | | |
|---|---|---|---|
| 2,820,103 | 1/1958 | Abbott | 179—18 |
| 2,976,367 | 3/1961 | Bruce et al. | 179—18 |
| 3,087,997 | 4/1963 | Smart | 179—18 |

ROBERT H. ROSE, *Primary Examiner.*

WILLIAM C. COOPER, *Examiner.*